(12) United States Patent
Willberg

(10) Patent No.: US 11,933,155 B2
(45) Date of Patent: Mar. 19, 2024

(54) SYSTEMS AND METHODS FOR PROCESSING PRODUCED OILFIELD BRINE

(71) Applicant: Schlumberger Technology Corporation, Sugar Land, TX (US)

(72) Inventor: Dean Willberg, Tucson, AZ (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

(21) Appl. No.: 18/040,198

(22) PCT Filed: Aug. 3, 2021

(86) PCT No.: PCT/US2021/044269
§ 371 (c)(1),
(2) Date: Feb. 1, 2023

(87) PCT Pub. No.: WO2022/031649
PCT Pub. Date: Feb. 10, 2022

(65) Prior Publication Data
US 2023/0279764 A1    Sep. 7, 2023

Related U.S. Application Data

(60) Provisional application No. 63/073,263, filed on Sep. 1, 2020, provisional application No. 63/060,500, filed on Aug. 3, 2020.

(51) Int. Cl.
*E21B 43/40* (2006.01)
*E21B 43/20* (2006.01)

(52) U.S. Cl.
CPC .............. *E21B 43/40* (2013.01); *E21B 43/20* (2013.01)

(58) Field of Classification Search
CPC .................................. E21B 43/40; E21B 43/20
See application file for complete search history.

(56) References Cited

U.S. PATENT DOCUMENTS 9,140,109 B2    9/2015   Suarez-Rivera
10,451,075 B1 * 10/2019  Mann ...................... E21B 43/40
(Continued)

FOREIGN PATENT DOCUMENTS

WO     2010077895 A1    7/2010

OTHER PUBLICATIONS

International Search Report and Written Opinion issued in International Patent Application No. PCT/US2021/044269 dated Nov. 8, 2021; 10 pages.

(Continued)

*Primary Examiner* — Silvana C Runyan
(74) *Attorney, Agent, or Firm* — Jeffrey D. Frantz

(57) ABSTRACT

A method of receiving a plurality of oilfield brine feedstocks from one or more producing wells producing hydrocarbons from a subterranean formation is provided. The method includes detecting, using one or more sensors, one or more properties of the plurality of oilfield brine feedstocks, selecting two or more oilfield brine feedstocks from the plurality based at least in part on the one or more properties of the plurality of oilfield brine feedstocks, blending the two or more oilfield brine feedstocks into a blended oilfield brine prior to desalinating and crystallizing a portion of the blended oilfield brine, desalinating and crystallizing the portion of the blended oilfield brine to produce desalinated water and a salt slurry suspension, selecting one or more candidate wells for reinjection of the salt slurry suspension into the one or more candidate wells, and reinjecting the salt slurry suspension into the one or more candidate wells.

19 Claims, 16 Drawing Sheets

(56) References Cited

U.S. PATENT DOCUMENTS

| | | | |
|---|---|---|---|
| 2008/0047326 A1* | 2/2008 | McCann | E03B 3/32 |
| | | | 405/53 |
| 2008/0237141 A1* | 10/2008 | Kerfoot | E21B 43/20 |
| | | | 210/150 |
| 2008/0299635 A1* | 12/2008 | Pfeiffer | C12P 7/54 |
| | | | 435/167 |
| 2016/0180475 A1* | 6/2016 | Phillips | G06Q 10/06311 |
| | | | 705/7.13 |
| 2016/0244349 A1 | 8/2016 | St. John | |
| 2016/0339354 A1 | 11/2016 | Govindan | |
| 2017/0057843 A1 | 3/2017 | Cioanta | |
| 2017/0114271 A1* | 4/2017 | Hudgens | B01D 5/0006 |
| 2019/0300410 A1 | 10/2019 | Katz | |

OTHER PUBLICATIONS

International Preliminary Report on Patentability of International Patent Application No. PCT/US2021/044269 dated Feb. 16, 2023, 7 pages.

\* cited by examiner

SYSTEMS AND METHODS FOR PROCESSING PRODUCED OILFIELD BRINE

CROSS-REFERENCES TO RELATED APPLICATIONS

This patent application is a National Stage Entry of International Application No. PCT/US2021/044269, filed Aug. 3, 2021, which (i) claims priority to and the benefit of U.S. Provisional Patent Application Ser. No. 63/060,500, entitled "Systems and Methods for Stress Diversion," filed Aug. 3, 2020, and (ii) claims priority to and the benefit of U.S. Provisional Patent Application Ser. No. 63/073,263, entitled "Systems And Methods For Facilitating High-Efficiency Saltwater Disposal Wells," filed Sep. 1, 2020, both of which are hereby incorporated by reference in their entireties for all purposes.

BACKGROUND

The present disclosure generally relates to various methods for processing produced oilfield brine.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Large volumes of saline and hypersaline brine are co-produced with oil from most formations around the world. The volume of brine produced in fact exceeds that of oil—often by large margins—for most active onshore fields. This brine is usually too saline for either surface discharge or surface reuse without relatively complex treatment and desalination operations that remove residual organics, dissolved salts, hydrogen sulfide and residual production chemicals. Fortunately, in most conventional oil fields, this brine can be processed and reinjected back into the producing formation from whence it came for pressure maintenance, water flooding, or enhanced oil recovery (EOR) operations. However, if reuse is not an option, then disposal of this water into ancillary formations through saltwater disposal (SWD) wells is the common practice.

SUMMARY

A summary of certain embodiments described herein is set forth below. It should be understood that these aspects are presented merely to provide the reader with a brief summary of these certain embodiments and that these aspects are not intended to limit the scope of this disclosure.

Certain embodiments of the present disclosure include a method that includes receiving one or more oilfield brine feedstocks from one or more producing wells producing hydrocarbons from a subterranean formation. The method also includes desalinating and at least partially crystallizing a portion of the one or more oilfield brine feedstocks to produce desalinated water and a salt slurry suspension. The method further includes selecting, using a process control system, one or more candidate wells for reinjection of the salt slurry suspension into the one or more candidate wells. In addition, the method includes reinjecting the salt slurry suspension into the one or more candidate wells.

In addition, certain embodiments of the present disclosure include an oilfield brine processing system that includes a desalination/crystallization system configured to receive one or more oilfield brine feedstocks from one or more producing wells producing hydrocarbons from a subterranean formation, and to desalinate and at least partially crystallize a portion of the one or more oilfield brine feedstocks to produce desalinated water and a salt slurry suspension. The oilfield brine processing system also includes a salt slurry suspension preparation system configured to prepare the salt slurry suspension, and to provide the salt slurry suspension to one or more candidate wells for reinjection of the salt slurry suspension into the one or more candidate wells.

In addition, certain embodiments of the present disclosure include an oilfield brine processing system that includes a desalination/crystallization system configured to receive one or more oilfield brine feedstocks from one or more producing wells producing hydrocarbons from a subterranean formation, and to desalinate and at least partially crystallize a portion of the one or more oilfield brine feedstocks to produce desalinated water and a salt slurry suspension. The oilfield brine processing system also includes a salt slurry suspension preparation system configured to prepare the salt slurry suspension, and to provide the salt slurry suspension to one or more candidate wells for reinjection of the salt slurry suspension into the one or more candidate wells. The oilfield brine processing system further includes a process control system configured to select the one or more candidate wells for reinjection of the salt slurry suspension into the one or more candidate wells.

In addition, certain embodiments of the present disclosure include a method that includes receiving one or more oilfield brine feedstocks from one or more hydrocarbon-producing wells. The method also includes pumping at least a portion of the one or more oilfield brine feedstocks through a desalination system using pressure generated by a pumping system. The method further includes desalinating the at least a portion of the one or more oilfield brine feedstocks using the desalination system to produce desalinated water and saltwater. In addition, the method includes injecting the saltwater into one or more saltwater disposal (SWD) wells using the pressure generated by the pumping system.

In addition, certain embodiments of the present disclosure include a water handling and disposal (WHD) system that includes one or more SWD wells configured to inject saltwater into a subterranean SWD formation. The WHD system also includes a desalination system configured to desalinate at least a portion of the one or more oilfield brine feedstocks received from one or more hydrocarbon-producing wells to produce desalinated water and saltwater. The WHD system further includes a pumping system configured to generate pressure to pump the at least a portion of the one or more oilfield brine feedstocks through the desalination system and to inject the saltwater produced by the desalination system into the one or more SWD wells. In addition, the WHD system includes a process control system configured to control a composition of the saltwater injected into the one or more SWD wells based at least in part on one or more properties of the one or more oilfield brine feedstocks detected by one or more sensors.

In addition, certain embodiments of the present disclosure include a method that includes receiving one or more oilfield brine feedstocks from one or more hydrocarbon-producing wells. The method also includes using a pumping system to inject at least a portion of the one or more oilfield brine feedstocks into one or more SWD wells. The method further includes actively controlling, using a process control system, a composition of the at least a portion of the one or more oilfield brine feedstocks injected into the one or more SWD wells based at least in part on one or more properties of the one or more oilfield brine feedstocks detected by one or more sensors.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings, in which.

DETAILED DESCRIPTION

Figure 1:
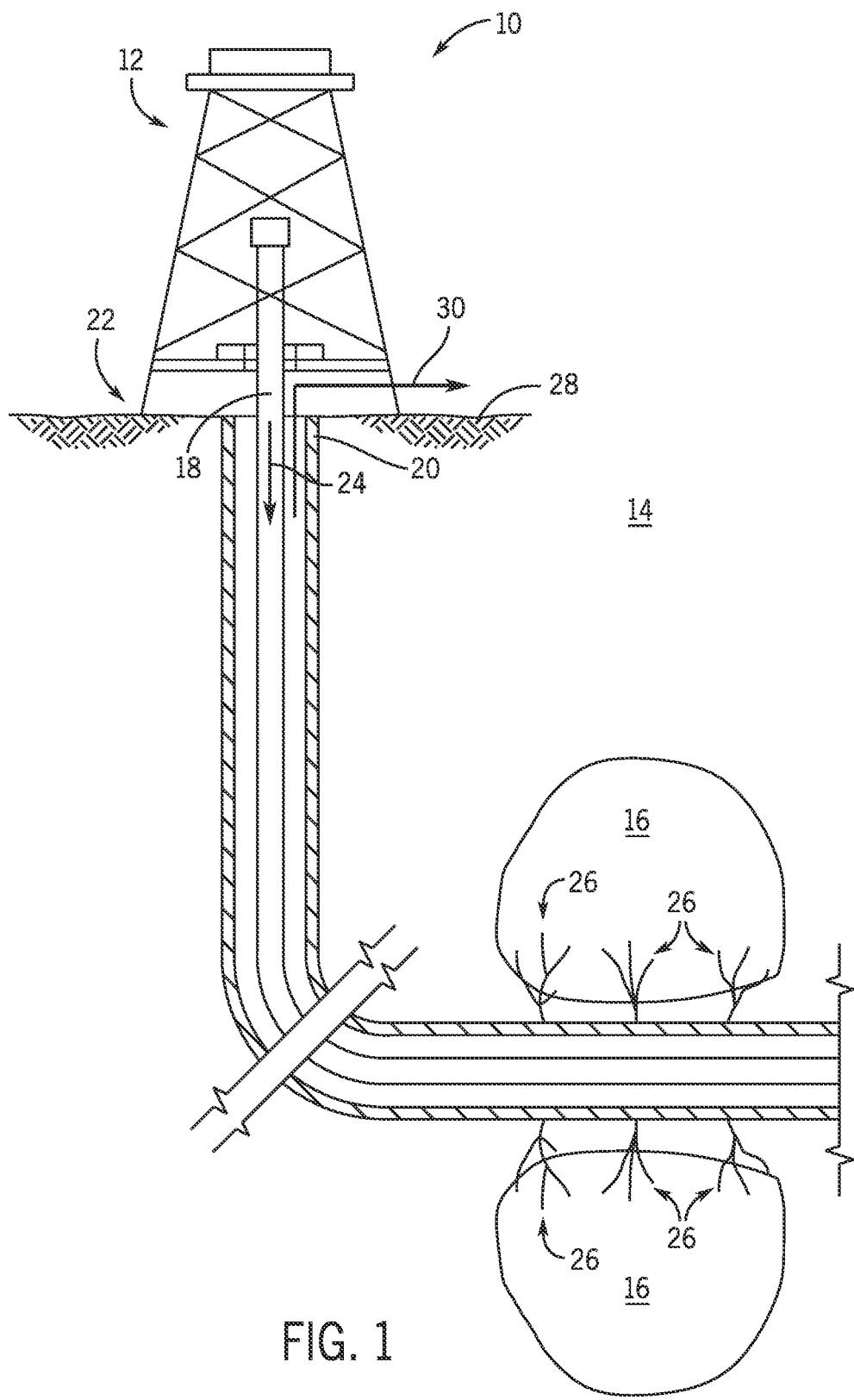
FIG. 1 illustrates a well site having a drilling rig positioned above a subterranean formation that includes one or more oil and/or gas reservoirs, in accordance with embodiments of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements." As used herein, the terms "up" and "down," "uphole" and "downhole", "upper" and "lower," "top" and "bottom," and other like terms indicating relative positions to a given point or element are utilized to more clearly describe some elements. Commonly, these terms relate to a reference point as the surface from which drilling operations are initiated as being the top (e.g., uphole or upper) point and the total depth along the drilling axis being the lowest (e.g., downhole or lower) point, whether the well (e.g., wellbore, borehole) is vertical, horizontal or slanted relative to the surface.

As used herein, a fracture shall be understood as one or more cracks or surfaces of breakage within rock. In general, fractures may have higher permeability than the surrounding rock, especially when they are filled with sand or ceramic proppants to withstand closure under formation stress; therefore fractures can be induced mechanically (e.g., hydraulically) in some reservoirs in order to boost hydrocarbon flow. When fractures are created in a formation by pressurized fluid that is used to carry and place solid state material into the fracture, and that material remains in the fracture, the additional material causes additional stress in the formation. Certain fractures may also be referred to as natural fractures to distinguish them from fractures induced as part of a reservoir stimulation. Fractures can also be grouped into fracture clusters (or "perf clusters") where the fractures of a given fracture cluster (perf cluster) connect to the wellbore through a single perforated zone. As used herein, the term "fracturing" or "hydraulic fracturing" refers to the process and methods of breaking down a geological formation and creating a fracture (i.e., the rock formation around a wellbore) by pumping fluid at relatively high pressures (e.g., pressure above the determined closure pressure of the formation) in order to increase production rates from a hydrocarbon reservoir.

In addition, as used herein, the terms "real time", "real-time", or "substantially real time" may be used interchangeably and are intended to described operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "automatic" and "automated" are intended to describe operations that are performed are caused to be performed, for example, by a process control system (i.e., solely by the process control system, without human intervention).

It is generally the case that most oil and gas wells produce water (e.g., formation water, and returned hydraulic fracturing fluid) along with hydrocarbons at some time during their productive life. Both the produced water and the returned injected hydraulic fracturing fluid or "flowback" (e.g., usually 15-50% of the initial volume returns, typically, gradually amalgamating with formation water) are deemed oilfield wastes and are, therefore, subject to regulatory constraints on handling and disposal. For example, FIG. 1 illustrates a well site 10 having a drilling rig 12 positioned above a subterranean hydrocarbon-producing formation 14 that includes one or more hydrocarbon reservoirs 16. During operation of the illustrated well, a derrick and a hoisting apparatus of the drilling rig 12 may raise and lower a drilling string 18 into and out of a wellbore 20 of a well 22 to drill the wellbore 20 into the subterranean hydrocarbon-producing formation 14, as well as to position downhole well tools within the wellbore 20 to facilitate completion and production operations of the well. The drilling rig 12 is also used to place steel casing strings that line the wellbore 20, and also to facilitate cementing and perforating operations. For example, subsequent to drilling and casing operations, in certain circumstances, a hydraulic fracturing fluid may be introduced into the well 22 through the casing, as illustrated by arrow 24, which may be used to create fractures 26 in the subterranean hydrocarbon-producing formation 14 to facilitate production of oil and/or gas resources from the well. As described in greater detail herein, the produced water and the returned injected hydraulic fracturing fluid may be returned to the surface 28 of the well site 10 (e.g., through the casing of the wellbore 20), as illustrated by arrow 30.

Subsequent to drilling, well construction, and hydraulic fracturing operations, both water and hydrocarbons are produced to the surface 28 through production tubing, pumps, and completions hardware installed in the wellbore 20. As described in greater detail herein, for certain hydrocarbon-producing wells 22, the produced water may be referred to as oilfield brine insofar as the produced water contains relatively high levels of dissolved salts. The dissolved salts in oilfield brine contain many different cationic (e.g., sodium, potassium, magnesium, calcium, strontium, barium, iron, and so forth) and anionic (e.g., chloride, fluoride, sulfate, carbonate, bicarbonate, silicate, and so forth) species. The concentrations of the different species may be highly variable, depending on the formation 14 from whence they were produced, and on the construction, fracturing, and production history of the well 22, but concentrations of the various salts may range from very low, all the way to fully saturated.

However, managing oilfield brine may be problematic in the certain regions (e.g., the Delaware basin of west Texas and southeast New Mexico) due to exceedingly large volumes of fluids produced, and their large aerial extent. In 2019, for example, it has been estimated that approximately 9 billion barrels of brine was produced in the Delaware basin. Although the Delaware basin is used as an example, the embodiments described herein are applicable to any applications worldwide wherever large volumes of produced brines are managed.

Due at least in part to the relatively high volumes produced, there are relatively few options for managing produced oilfield brine in the Delaware basin. For example, certain unconventional formations are too impermeable for conventional water flooding and pressure maintenance operations. The timescale for water injection into these formations—at pressures below the fracturing gradient (i.e., the pressure required to induce fractures in rock at a given depth, for example, the pressure gradient at which a specific formation interval breaks down and accepts fluid) and at any meaningful flow rates—would be much for too long. Furthermore, very few collocated conventional oilfield operations exist in the Delaware basin that could accept any meaningful additional volumes of produced water for their own waterflooding and pressure maintenance operations. "Recycling" the produced water as fracturing fluids is a third option that, while important, can only absorb a portion of the total produced water, and its capacity depends on drilling and fracturing activity.

Figure 2:
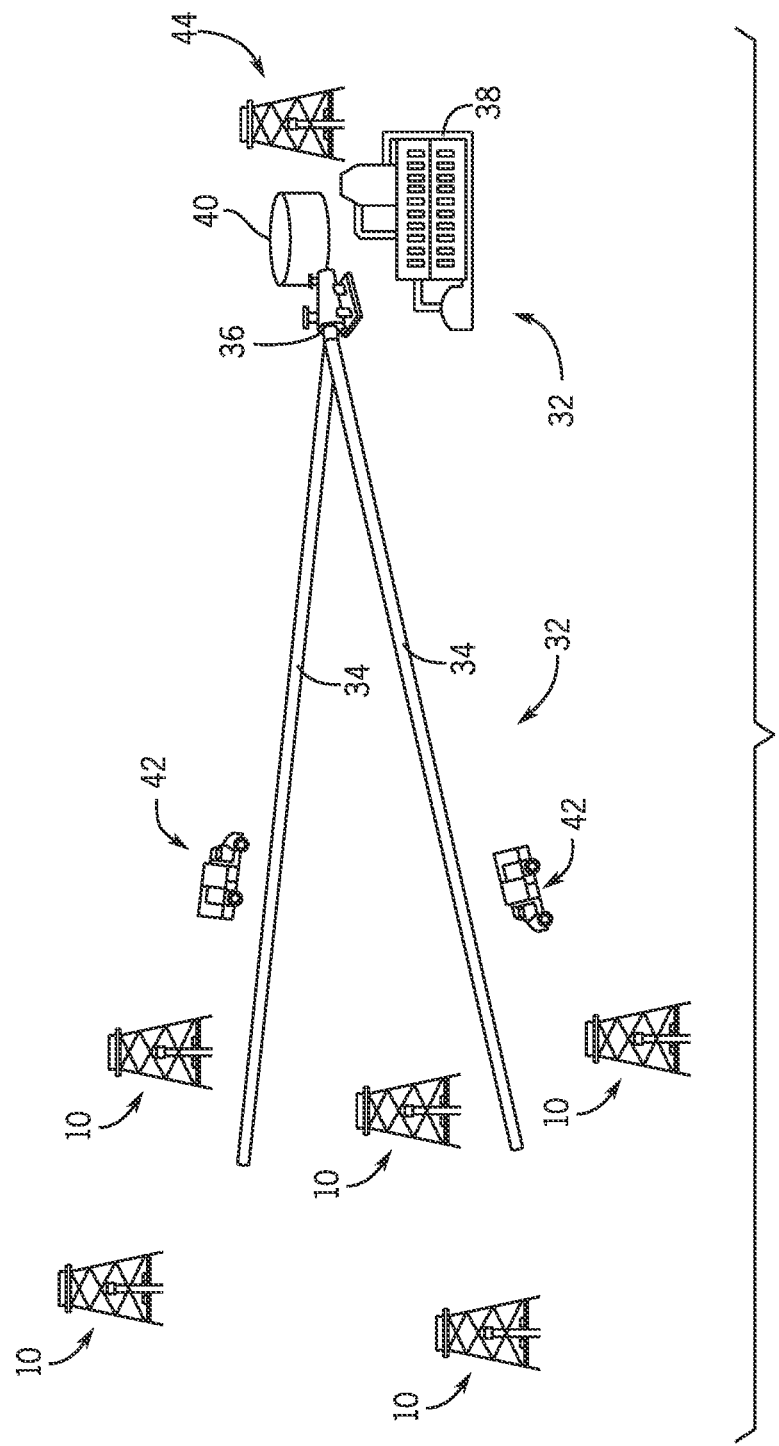
FIG. 2 illustrates a water handling and disposal (WHD) system whereby produced water from a plurality of well sites are disposed and handled by the WHD system, in accordance with embodiments of the present disclosure.

In such situations, operators often contract for disposal and handling of the oilfield brine with a midstream specialist firm focused on water handling and disposal (WHD). For example, FIG. 2 illustrates a WHD system 32 whereby oilfield brine from a plurality of well sites 10 are disposed and handled by the WHD system 32. As illustrated, in certain embodiments, handling of the oilfield brine is done via a relatively capital expenditure-intensive and usually proprietary network of pipelines 34, pumping stations 36, treatment facilities 38, storage tanks 40, trucks 42, and so forth. The WHD firm's existing physical infrastructure network exists to accept, convey, treat, and disperse/dispose of oilfield brine. Disposal of oilfield brine is often via reinjection into a salt-water disposal (SWD) well 44, often after treatment to remove potentially harmful scaling ions and/or solids as the SWD owner dictates (e.g., to preserve injectivity to maintain the SWD well 44). Depending on circumstances, owners of the WHDs may also own SWD wells 44 or may simply pay a per-barrel fee to an SWD owner for disposal. Regardless, operators of the wells at the well sites 10 must plan for cost-efficient disposal of all oilfield brine for each project and each well.

Currently, SWD wells are the preponderant reliable option to manage produced water in the Delaware Basin. The receiving geological formation at the end of an SWD well 44 provides only one environmental service—it is a container that functions as the last receptacle for the waste brine. Unfortunately, these SWD wells 44 and their associated disposal formations have two serious limitations. First, they can only accept a limited volume of fluid, and they can only accept it at a limited rate—otherwise their formation pressures may exceed safe operating levels. Currently, it is not known whether the SWD capacity in the Delaware basin is enough to accept all of the projected produced water at a reasonable price. Second, SWD wells 44 and their receiving formations may be strained to the point of potential catastrophic consequences if overused. Since brine has extremely low compressibility, the pore pressures in the receiving geological formations rise with the volume of brine injected over time. This elevated pore pressure could potentially cause breakouts on new wells as they are drilled through formations near the SWD wells 44.

Alternative "disposal", or better stated "re-use", technologies that divert significant volumes of produced brine away from, and reduce the reliance on, SWD wells 44 could have significant economic value. This value is amplified if these new technologies provide additional value-added services beyond environmental containment of the produced brine. Embodiments of the present disclosure describe systems and methods wherein the produced brine is deconstructed into two parts, and both parts are used to provide useful services for oilfield operations in addition to the environmental containment of the salt. Returning now to FIG. 1, the first part is a stream of desalinated water (e.g., either in the liquid or vapor phase, as described in greater detail herein) pure enough for beneficial use on the surface 28, or for surface discharge. Second, a salt slurry—composed of solid salts and saturated brine—is created that may be reinjected into the producing formation 14 from whence it came. Reinjected into its home formation 14, the salt slurry may be placed to provide stress diversion services that assist in infill drilling and long-term field development. For example, in certain embodiments, the salt slurry may be reinjected into its home formation 14 to create stresses and strains in the formation 14 that help stimulate the formation 14.

The present disclosure generally relates to processing produced oilfield brine. In particular, the embodiments described herein include two main categories of embodiments. For example, the embodiments illustrated and described with reference to FIGS. 3-8 generally relate to processing produced oilfield brine by deconstructing it into two useful components: (1) desalinated water and (2) a suspension of solid-state salt (e.g., crystallized salt) slurried in a salt-saturated brine for reinjection back into a formation from which it was originally produced. In addition, the embodiments illustrated and described with reference to FIGS. 9-16 generally relate to processing oilfield brine received from hydrocarbon-producing wells by: (1) coupling high-pressure desalination technologies with SWD operations, (2) active management of SWD water composition at the rock face through dual stream (e.g., split-stream) injection, and/or (3) coupled SWD injection, flow assurance, and stimulation to minimize SWD formation damage and injection pressures. It will be appreciated that the embodiments illustrated and described with reference to FIGS. 3-8 may be combined with the embodiments illustrated and described with reference to FIGS. 9-16 in certain scenarios.

The embodiments described herein include systems and methods for processing produced oilfield brine by deconstructing it into two useful components, and subsequently using those two components independently for beneficial purposes. By converting the produced water waste stream into these two useful components, the need for SWD wells 44 may be reduced and possibly even eliminated. The first component produced in this process is desalinated water that is either used or disposed of on the surface 28. The value of purified water is obvious, especially in arid regions where sourcing and transporting water is relatively expensive. As used herein, the term "desalinated water" is intended to mean water that has been desalinated, and that exists in a liquid phase, a vapor phase (e.g., water evaporated from the salt suspension), or some combination thereof.

The second component is a suspension of solid-state salt (e.g., crystallized salt) slurried in a salt-saturated brine, which may be used to beneficially stimulate the reservoir 16, as described in greater detail herein. In certain embodiments, the salt suspension may be formulated and injected into hydrocarbon-producing formations 14 above hydraulic fracturing pressure to intentionally create regions of localized high stress within the respective formations 14. In particular, in certain embodiments, the salt suspension may be reinjected back into the formation 14 from which it was originally produced. One beneficial purpose of the intentionally stressed regions in the reservoir is to prevent adverse hydraulic fracture growth from daughter wells 22 into previously depleted zones during infill drilling programs. As used herein, the term "parent wells" are intended to mean wells 22 that are drilled into a reservoir 16 earlier in time, and "daughter wells" are intended to mean wells 22 that are drilled into a reservoir 16 later in time (i.e., after associated "parent wells").

Figure 3:
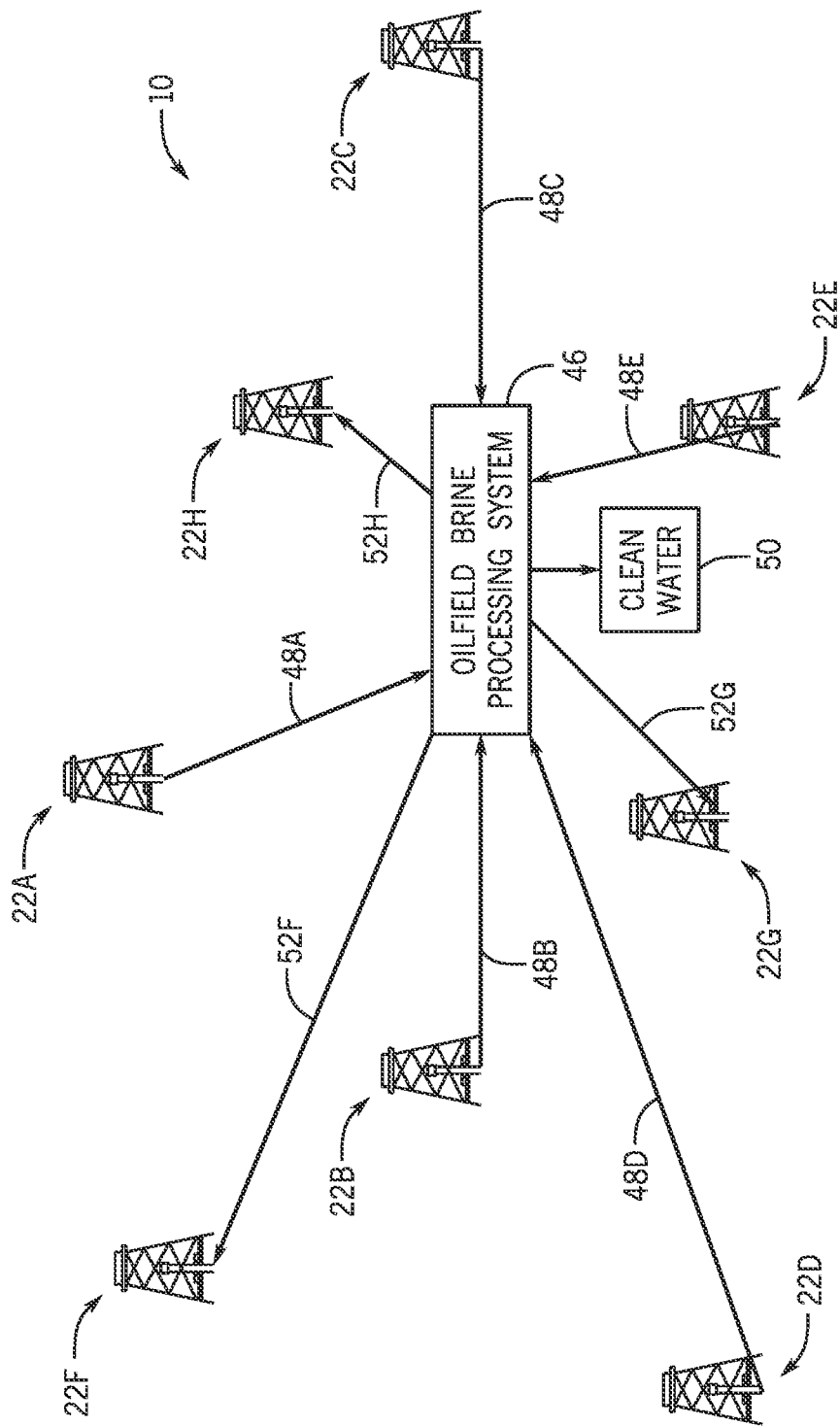
FIG. 3 illustrates an example well site having a plurality of wells, which may utilize an oilfield brine processing system, in accordance with embodiments of the present disclosure.

FIG. 3 illustrates an example well site 10 having a plurality of wells 22, which may utilize an oilfield brine processing system 46, as described in greater detail herein. As illustrated in FIG. 3, in certain embodiments, a well site 10 may include a plurality of hydrocarbon-producing wells 22A, 22B, 22C, 22D, 22E and a plurality of non-producing wells 22F, 22G, 22H. In certain embodiments, oilfield brine 48 produced by one or more of the producing wells 22A, 22B, 22C, 22D, 22E may be conveyed (e.g., via pipelines 34) to the oilfield brine processing system 46 for processing into relatively clean water 50 and a salt slurry suspension 52, which may then be conveyed (e.g., via pipelines 34) to one or more of the wells 22A, 22B, 22C, 22D, 22E, 22F, 22G, 22H for reinjection back into the formation(s) 14 underneath the well site 10, as described in greater detail herein.

Although described herein as often reinjecting the salt slurry suspension back into the formation(s) 14 underneath the well site 10 via one or more non-producing wells 22F, 22G, 22H, in other embodiments, the salt slurry suspension may instead be reinjected back into the formation(s) 14 via one or more producing wells 22A, 22B, 22C, 22D, 22E. For example, in certain embodiments, the salt slurry suspension may instead be reinjected back into one or more non-producing regions of one or more producing wells 22A, 22B, 22C, 22D, 22E. In addition, in certain embodiments, the salt slurry suspension may instead be reinjected into one or more new wells 22 to improve fracturing of the one or more new wells 22.

Figure 4:
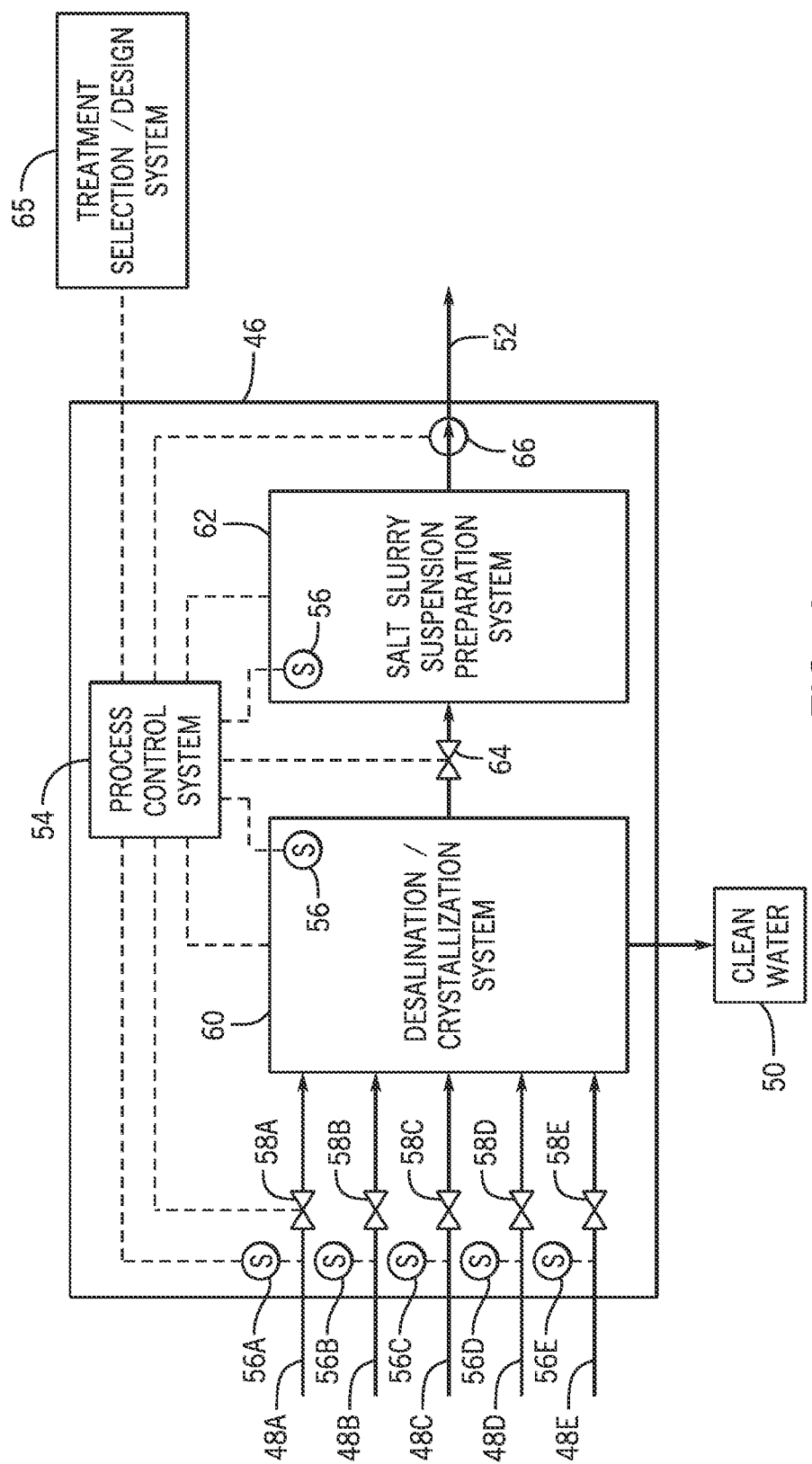
FIG. 4 is a schematic diagram of the oilfield brine processing system of FIG. 3, in accordance with embodiments of the present disclosure.

FIG. 4 is a schematic diagram of the oilfield brine processing system 46 of FIG. 3. As illustrated, in certain embodiments, the oilfield brine processing system 46 may receive a plurality of oilfield brine feedstocks 48A, 48B, 48C, 48D, 48E (e.g., from a plurality of respective producing wells 22A, 22B, 22C, 22D, 22E via pipelines 34, as illustrated in FIG. 3) and may select one or more of the oilfield brine feedstocks 48A, 48B, 48C, 48D, 48E produced in the field for processing. For example, in certain embodiments, a process control system 54 may use corresponding sensors 56A, 56B, 56C, 56D, 56E to detect certain properties (e.g., composition, concentration, viscosity, salinity, and/or density of dissolved salts) of the oilfield brine feedstocks 48A, 48B, 48C, 48D, 48E and, based at least in part on the detected properties, may actuate (e.g., send control signals to open/close) corresponding valves 58A, 58B, 58C, 58D, 58E to control blending of the oilfield brine feedstocks 48A, 48B, 48C, 48D, 48E for delivery to a desalination/crystallization system 60, which may be used to transform the blended oilfield brine feedstocks 48A, 48B, 48C, 48D, 48E into relatively clean water 50 and a salt slurry suspension 52 for reinjection, as described in greater detail herein. The desalination/crystallization system 60 may utilize any desalination/crystallization processes, such as salt crystallization and zero liquid discharge (ZLD) technologies (or even evaporation ponds). In addition, although a plurality of valves 58A, 58B, 58C, 58D, 58E are illustrated in FIG. 4 as controlling the blending of the oilfield brine feedstocks 48A, 48B, 48C, 48D, 48E, in other embodiments, other processing equipment, such as pumps, heating elements, and so forth, may be actuated to at least partially control the blending of the oilfield brine feedstocks 48A, 48B, 48C, 48D, 48E.

Once the oilfield brine feedstocks 48A, 48B, 48C, 48D, 48E have been selected for processing by the process control system 54 and blended based on the control of the corresponding valves 58A, 58B, 58C, 58D, 58E (or other processing equipment), the resulting blended oilfield brine delivered to the desalination/crystallization system 60 may be desalinated and at least partially crystallized into the relatively clean water 50 and the salt slurry suspension 52 for reinjection, as described in greater detail herein. In certain embodiments, once the salt slurry suspension 52 has been produced by the desalination/crystallization system 60, the salt slurry suspension 52 may be further prepared for reinjection using a salt slurry suspension preparation system 62, as described in greater detail herein. In certain embodiments, delivery of the flow of the salt slurry suspension 52 from the desalination/crystallization system 60 to the salt slurry suspension preparation system 62 may be controlled by the process control system 54 by actuating (e.g., sending control signals to open/close) a valve 64 disposed between the desalination/crystallization system 60 and the salt slurry suspension preparation system 62.

Although illustrated in FIG. 4 as including a process whereby the oilfield brine feedstocks 48A, 48B, 48C, 48D, 48E are separated into relatively clean water 50 and a salt slurry suspension 52 by a desalination/crystallization system 60, then the salt slurry suspension 52 is further prepared for reinjection using a salt slurry suspension preparation system 62, other processing techniques may be used in other embodiments. For example, in certain embodiments, salt crystals may first be removed from the oilfield brine feedstocks 48A, 48B, 48C, 48D, 48E (e.g., using a dehydration system), and then ground into the right particle size and mixed into a salt slurry suspension 52.

In certain embodiments, a treatment selection/design system 65 may select one or more wells 22 from a pool of one or more candidates wells 22A, 22B, 22C, 22D, 22E, 22F, 22G, 22H (e.g., based on stress requirements for future field development, local rock mechanics and stress conditions, general hydraulic fracturing concepts, and so forth) for reinjection of the resulting prepared salt slurry suspension 52 from the salt slurry suspension preparation system 62, as described in greater detail herein. For example, in certain embodiments, the treatment selection/design system 65 may analyze the formation(s) 14 and/or associated reservoir(s) 16 underneath the well site 10 that includes the wells 22 for potential stress diversion treatments for which the resulting prepared salt slurry suspension 52 may be used. In addition, in certain embodiments, the treatment selection/design system 65 may analyze the water quality at or near the well site 10, among other parameters, to determine potential stress diversion treatments for which the resulting prepared salt slurry suspension 52 may be used.

In certain embodiments, based at least in part on determined stress diversion treatments, the process control system 54 may adjust the blending of the oilfield brine feedstocks 48A, 48B, 48C, 48D, 48E to modify the prepared salt slurry suspension 52 produced by the desalination/crystallization system 60 and the salt slurry suspension preparation system 62 for the purpose of further engineering the prepared salt slurry suspension 52 for the determined stress diversion treatments, as described in greater detail herein. Finally, the prepared salt slurry suspension 52 may be conveyed (e.g., via pipelines 34, as illustrated in FIG. 3, or by truck) to a selected candidate wells 22 (i.e., wells 22 that are candidates to receive the salt slurry suspension 52) for reinjection into the formation(s) 14 underneath the well site 10 including the wells 22. As illustrated in FIG. 4, in certain embodiments, one or more pumps 66 may be used to pump the prepared salt slurry suspension 52 to the selected candidate wells 22.

The embodiments described herein provide useful advantages over conventional systems. In general, the "salt" and other harmful constituents in the produced water (e.g., the oilfield brine 48) is sequestered back into the formation 14 from whence it came. This is beneficial for both functional and regulatory reasons. Functionally, the primary responsibility of oilfield brine management is to protect the environment and people by preventing contamination of the surface environment and groundwater with oilfield brine, oil, naturally occurring radioactive material (NORM), $H_2S$ and other hazardous materials. The embodiments described herein provide a process by which salts and other constituents of oilfield brine 48 are effectively isolated from the surface environment where they can cause harm to the environment, agricultural resources, and human health. From a regulatory perspective, the embodiments described herein create a new cyclical "cradle-to-cradle" method for managing salts and other harmful dissolved and solid species in oilfield brine 48, and provide a logically consistent methodology for engaging with environmental, social and guidance (ESG) stakeholders. Although potentially requiring changes in current regulations relating to the handling of oilfield waste, the embodiments described herein present a new way of thinking about brine management, and provide new systems and methods for better, safer, and more satisfactory means of fulfilling obligations to the environment and to the public.

In addition, the embodiments described herein divert produced brine away from SWD formations (e.g., such as the SWD wells 44 illustrated in FIG. 2). In particular, oilfield brine 48 processed by the oilfield brine processing system 46 will not be pumped into SWD formations. Rather, in contrast, the embodiments described herein create a new, separate means of disposing/re-using produced water (e.g., the oilfield brine 48) that does not stress existing SWD formations.

In addition, the embodiments described herein facilitate stress diversion stimulation of hydrocarbon-producing formations 14. Stress diversion (e.g., stress-shadowing) of hydraulic fractures is an understood and characterized phenomenon observed during oilfield completions and reservoir management operations. Although stress shadowing is often viewed as a problem to be overcome, it has been recognized that creative utilization of this phenomenon may produce beneficial results, such as actively directing (e.g., manipulating) the direction of hydraulic fracture growth during subsequent completion operations in either the same well 22, or in adjacent wells 22 in the altered stress region. See, e.g., U.S. Pat. No. 9,140,109 to Suarez-Rivera et al., which is incorporated herein by reference in its entirety.

The embodiments described herein reconfigure the salt slurry from being a hazardous waste into a useful component of a new service by reinjecting it into hydrocarbon-producing formations 14. In particular, the reinjected salt slurry suspension 52 may provide localized stress diversion that assists in rational field development, and in the placement of infill wells 22 for improved total hydrocarbon recovery. In addition, injection of the salt slurry suspension 52 above the fracturing gradient may restress the formation 14 in the vicinity of a depleted well 22 or in a depleted region of a long horizontal well 22 by the creation of a stress shadow. The embodiments described herein may also be used to prevent adverse fracture growth issues from nearby in-fill drilled wells 22. In addition, the embodiments described herein produce relatively clean (e.g., desalinated) water 50, which may be used for oilfield or non-oilfield applications at the surface 28 of a well site 10 or may be safely disposed of in the environment.

Figure 5:
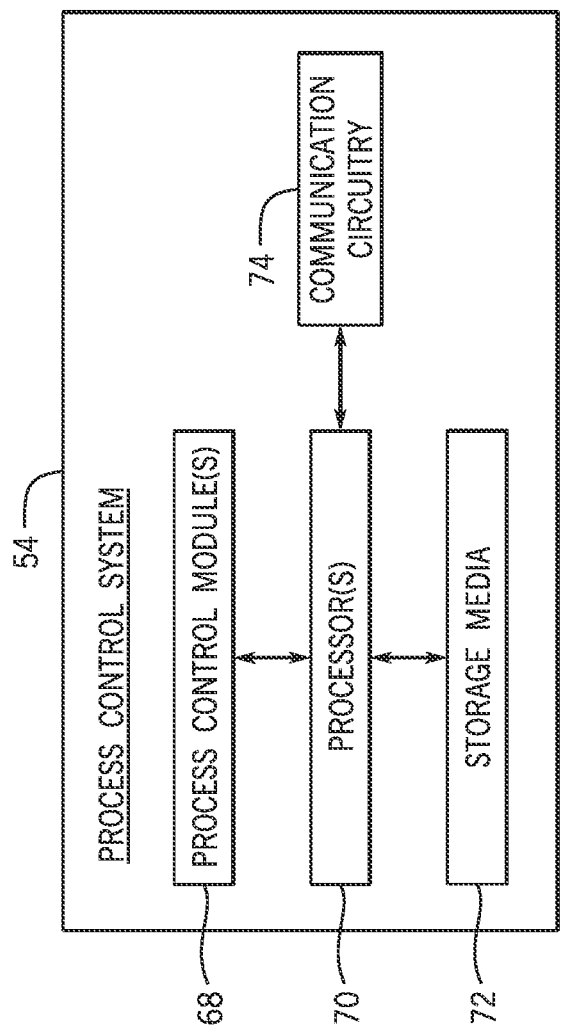
FIG. 5 is a schematic diagram of a process control system of the oilfield brine processing system of FIG. 4, in accordance with embodiments of the present disclosure.

FIG. 5 is a schematic diagram of a process control system 54 of the oilfield brine processing system 46 of FIG. 4. As illustrated in FIG. 5, in certain embodiments, the process control system 54 of the oilfield brine processing system 46 described herein may include one or more process control modules 68 (e.g., a program of computer-executable instructions and associated data) that may be configured to perform various functions of the embodiments described herein. In certain embodiments, to perform these various functions, a process control module 68 executes on one or more processors 70 of the process control system 54, which may be connected to one or more storage media 72 of the process control system 54. Indeed, in certain embodiments, the one or more process control modules 68 may be stored in the one or more storage media 72 of the process control system 54.

In certain embodiments, the one or more processors 70 of the process control system 54 may include a microprocessor, a microcontroller, a processor module or subsystem, a programmable integrated circuit, a programmable gate array, a digital signal processor (DSP), or another control or computing device. In certain embodiments, the one or more storage media 72 of the process control system 54 may be implemented as one or more non-transitory computer-readable or machine-readable storage media. In certain embodiments, the one or more storage media 72 of the process control system 54 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the process control module(s) 68 may be provided on one computer-readable or machine-readable storage medium of the storage media 72 of the process control system 54, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 72 of the process control system 54 may be located either in the machine running the machine-readable instructions, or may be located at a remote site from which machine-readable instructions may be downloaded over a network for execution.

In certain embodiments, the processor(s) 70 of the process control system 54 may be connected to communication circuitry 74 of the process control system 54 to allow the process control system 54 to communicate with the desalination/crystallization system 60 and the salt slurry suspension preparation system 62, as well as the various sensors 56, valves 58, 64, pumps 66 of the oilfield brine processing system 46, other processing equipment, and so forth, for the purpose of controlling operation of the oilfield brine processing system 46, as described in greater detail herein.

In certain embodiments, the communication circuitry 74 of the process control system 54 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 74 of the process control system 54 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

Figure 6:
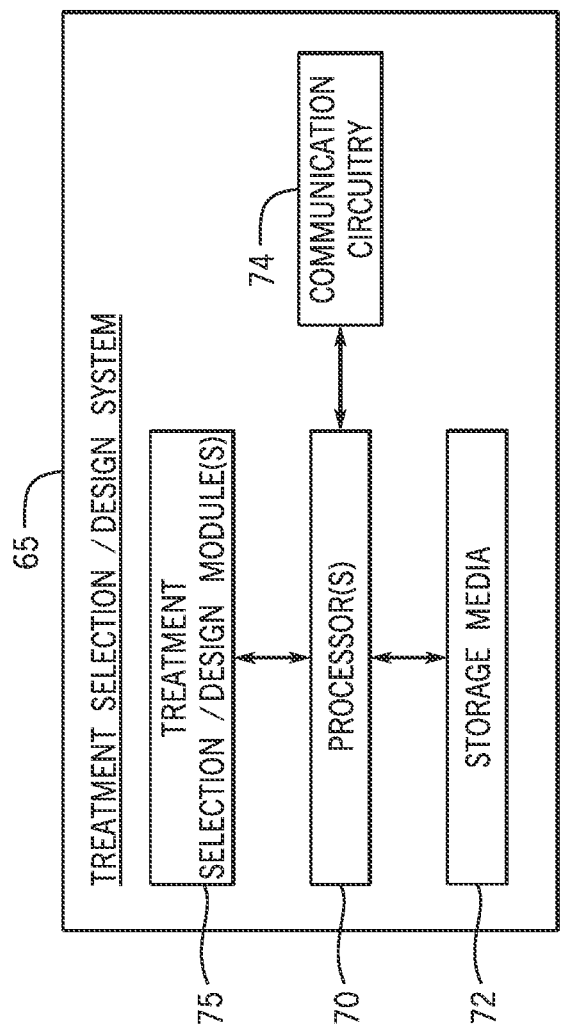
FIG. 6 is a schematic diagram of a treatment selection/design system of the oilfield brine processing system of FIG. 4, in accordance with embodiments of the present disclosure.

FIG. 6 is a schematic diagram of a treatment selection/design system 65 of the oilfield brine processing system 46 of FIG. 4. As illustrated in FIG. 6, in certain embodiments, the treatment selection/design system 65 of the oilfield brine processing system 46 described herein may include one or more treatment selection/design modules 75 (e.g., a program of computer-executable instructions and associated data) that may be configured to perform various functions of the embodiments described herein. In certain embodiments, to perform these various functions, a treatment selection/design module 75 executes on one or more processors 70 of the treatment selection/design system 65, which may be connected to one or more storage media 72 of the treatment selection/design system 65. Indeed, in certain embodiments, the one or more treatment selection/design modules 75 may be stored in the one or more storage media 72.

In certain embodiments, the one or more processors 70 of the treatment selection/design system 65 may include a microprocessor, a microcontroller, a processor module or subsystem, a programmable integrated circuit, a programmable gate array, a digital signal processor (DSP), or another control or computing device. In certain embodiments, the one or more storage media 72 of the treatment selection/design system 65 may be implemented as one or more non-transitory computer-readable or machine-readable storage media. In certain embodiments, the one or more storage media 72 of the treatment selection/design system 65 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the treatment selection/design module(s) 75 may be provided on one computer-readable or machine-readable storage medium of the storage media 72 of the treatment selection/design system 65, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 72 of the treatment selection/design system 65 may be located either in the machine running the machine-readable instructions, or may be located at a remote site from which machine-readable instructions may be downloaded over a network for execution.

In certain embodiments, the processor(s) 70 of the treatment selection/design system may be connected to communication circuitry 74 of the treatment selection/design system 65 to allow the treatment selection/design system 65 to communicate with the process control system 54 for the purpose of synchronizing operation of the oilfield brine processing system 46 (e.g., controlled by the process control system 54) with the selection of candidate wells 22 (i.e., wells 22 that are candidates to receive the salt slurry suspension 52) and designing of stress diversion treatments (e.g., performed by the treatment selection/design system 65), as described in greater detail herein.

In certain embodiments, the communication circuitry 74 of the treatment selection/design system 65 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 74 of the treatment selection/design system 65 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

As described in greater detail herein, the tailoring of one of the products (e.g., the salt slurry suspension 52) of the desalination/crystallization process for subsequent reservoir stimulation by stress diversion provides benefits over conventional oilfield systems. In particular, the embodiments described herein turn both a waste product (e.g., brine and salts), as well as the subterranean stresses created by this waste product, into useful components of a new service for improved hydrocarbon recovery. In addition, the embodiments described herein place the salts and a portion of the water produced during production from a given formation 14 back into the same formation 14 from whence they came. In addition, using the embodiments described herein may help balance out reservoir pressures and stresses in the formations 14 of interest and prevent over-pressuring of SWD formations (e.g., the SWD wells 44 illustrated in FIG. 2). Furthermore, the cyclical "cradle-to-cradle" approach of the present embodiments provides a logically consistent methodology for engaging with ESG stakeholders.

Figure 7:
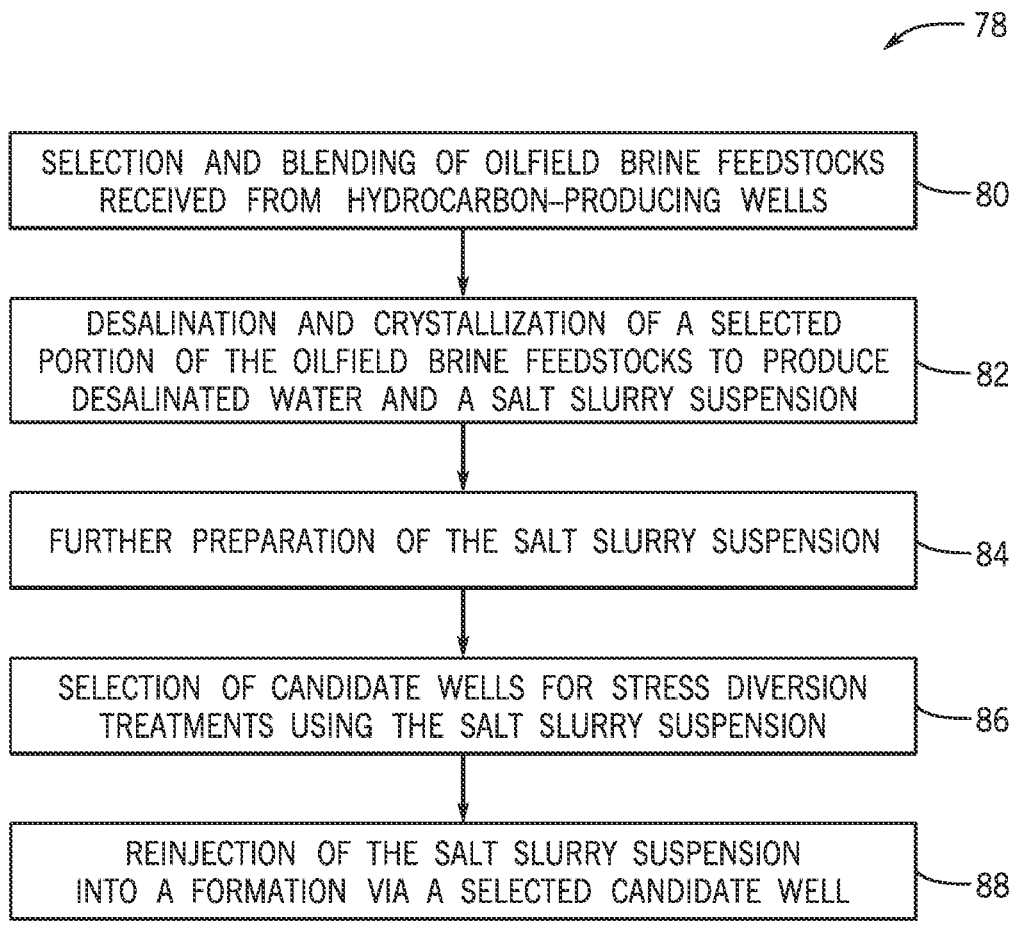
FIG. 7 is a block diagram of a method of processing oilfield brine, in accordance with embodiments of the present disclosure.

FIG. 7 is a block diagram of a method 78 of processing oilfield brine 48, as described in greater detail herein. As illustrated in FIG. 7, in certain embodiments, the method 78 may include selection and blending of one or more oilfield brine feedstocks 48A, 48B, 48C, 48D, 48E received from one or more corresponding hydrocarbon-producing wells 22A, 22B, 22C, 22D, 22E of a well site 10 (block 80). As used herein, the term "salt" is used in its generic sense and refers to all of the total dissolved solid (TDS) inorganic species that are typically found in produced water brines. Sodium chloride is usually the predominant constituent, but many other cations (e.g., calcium, magnesium, potassium, barium, and so forth) and anions (e.g., sulfate, bicarbonate, fluoride, and so forth) may be found dissolved in oilfield brines 48 as well, and may precipitate out as many different solid-state species.

Figure 8:
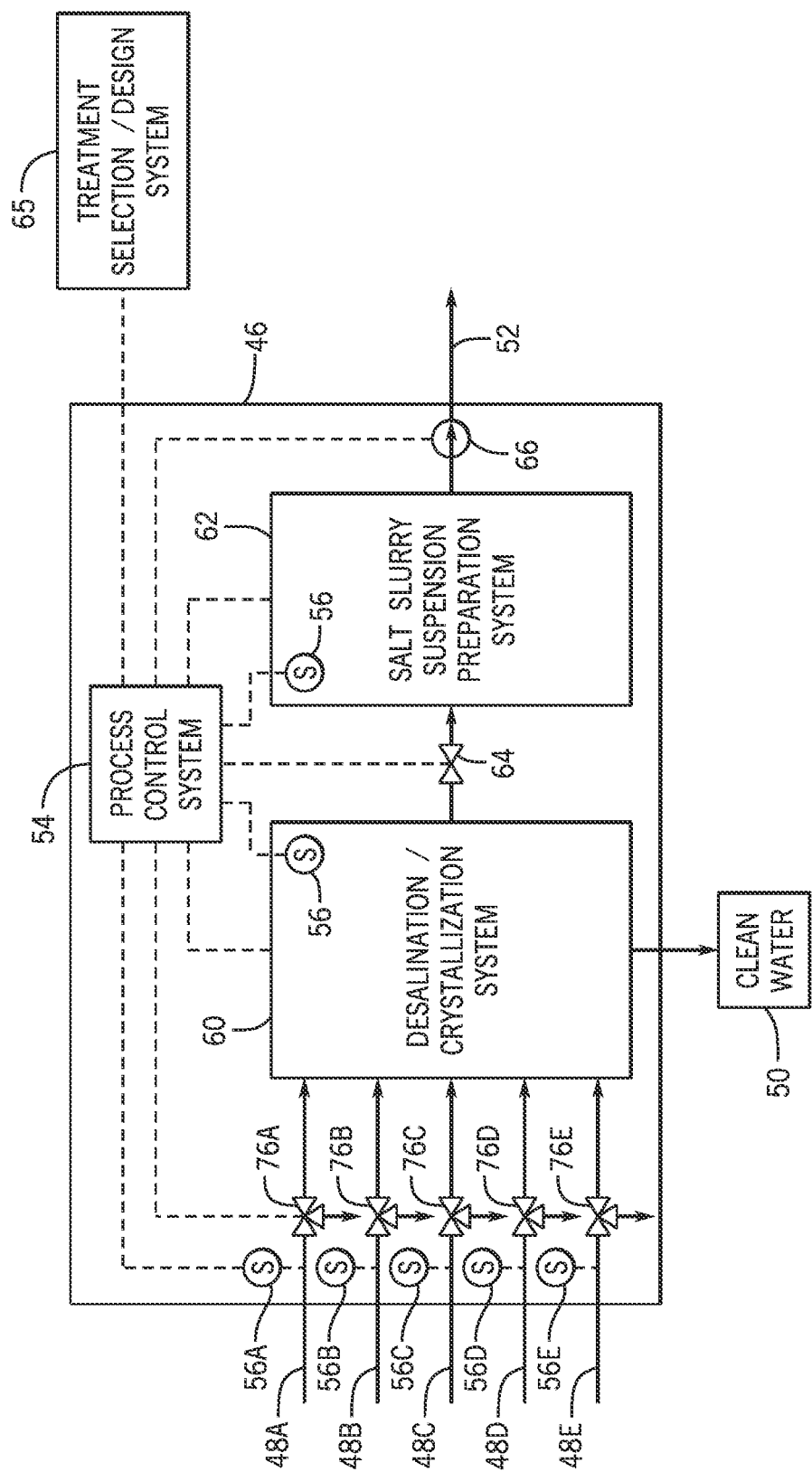
FIG. 8 is a schematic diagram of the oilfield brine processing system of FIG. 4 having three-way valves for selectively directing oilfield brine feedstocks, in accordance with embodiments of the present disclosure.

Oilfield brines 48 are highly variable in the concentration of the TDS, and brine concentrations within certain regions may range from practically fresh water, all the way up to fully saturated brines. In many oilfields, brines with concentrations ranging from 35,000 parts per million (ppm) to 150,000 ppm or more are common, depending on location and on the specific formation 14. In general, relatively higher concentration oilfield brines 48 may minimize the total energy requirements for desalination in the desalination/crystallization system of the oilfield brine processing system 46. Indeed, in certain embodiments, relatively lower concentration oilfield brines 48 may be directed for recycling as hydraulic fracturing fluids, as opposed to being processed by the desalination/crystallization system 60 and the salt slurry suspension preparation system 62 of the oilfield brine processing system 46. For example, as illustrated in FIG. 8, in certain embodiments, the process control system 54 may determine that TDS concentrations of certain oilfield brine feedstocks 48A, 48B, 48C, 48D, 48E are below a predetermined threshold (e.g., below 50,000 ppm, below 40,000 ppm, below 30,000 ppm, below ppm, below 10,000 ppm, or even lower) based at least in part on feedback from corresponding sensors 56A, 56B, 56C, 56D, 56E, and may actuate (e.g., send control signals to open/close) corresponding three-way valves 76A, 76B, 76C, 76D, 76E to direct those particular oilfield brine feedstocks 48A, 48B, 48C, 48D, 48E for use as hydraulic fracturing fluids, as opposed to delivering those particular oilfield brine feedstocks 48A, 48B, 48C, 48D, 48E to the desalination/crystallization system 60 of the oilfield brine processing system 46.

Returning now to FIG. 7, in certain embodiments, the method 78 may also include desalination and crystallization of a selected portion of the incoming oilfield brine feedstocks 48A, 48B, 48C, 48D, 48E to produce relatively clean (e.g., desalinated) water 50 and a salt slurry suspension 52 (block 82) using the desalination/crystallization system 60 of the oilfield brine processing system 46 to produce relatively clean water 50 and a salt slurry suspension 52. To avoid problems associated with the disposal of solid waste streams, conventional SWD practices avoid the precipitation of salts into the solid state. In contrast, the embodiments described herein counter these conventional techniques by creating a use for the solid rock salt as a stress diverting agent. The desalination/crystallization system 60 may utilize many different types of technologies suitable for desalination of the oilfield brine feedstocks 48A, 48B, 48C, 48D, 48E, and for the subsequent crystallization of salts. For example, in certain embodiments, the desalination/crystallization system 60 may utilize solar energy or evaporation ponds to keep energy costs relatively low.

In addition, in certain embodiments, the method 78 may include further preparation of the salt slurry suspension 52 produced by the desalination/crystallization system 60 (block 84) using the salt slurry suspension preparation system 62 of the oilfield brine processing system 46 prior to reinjection. The design and engineering of the salt slurry suspension 52 will follow steps similar to those used in designing conventional hydraulic fracturing operations (or drill-cuttings disposal operations), and many of the phenomena managed during fracturing operations will also be managed using the embodiments described herein. However, additional considerations will also be managed using the embodiments described herein. For example, solid-state rock salts are used (e.g., instead of sand or ceramic proppant) in the salt slurry suspension 52. In addition, the liquid phase will be a salt solution that in general "reacts" with the solid-state suspended rock salts. Nominally, if a liquid phase solution exists with a suspension of rock salts for some time, then it will be either in an equilibrium or quasi-equilibrium condition with those solids. However, this condition may be disturbed during pumping, and reactions between components of the liquid phase and the solids may possibly react as the salt slurry suspension 52 travels through different pressure and temperature regimes. In addition, the salt slurry suspension 52 may possibly react with different formation rocks and, especially, in-situ reservoir brine when reinjected. For example, since the salt slurry suspension 52 will be at saturated conditions, it could absorb water from the formation 14 due to osmotic pressure. This could conceivably lead to an increase in fluid volume in the fracture (whereas, in normal fracturing operations, fluid volume within the fracture is lost due to leak-off into the porous rock) at some point in the fracturing or post-fracturing process, depending on the balance of applied hydraulic pressure and difference of chemical potentials in the pumped and in situ brines.

Certain practices and procedures may be followed using the embodiments described herein. In the later stages of one embodiment of this invention, the salt slurry suspension 52 may be pumped downhole at pressures sufficiently high enough to create hydraulic fractures in the rock (i.e., that is at fracturing pressures in excess of the fracturing gradient). In this embodiment, the operation resembles a conventional hydraulic fracturing operation, but instead of carrying sand or proppant, the fluid, a saturated salt solution, carries suspended solid state salt crystals. One method of minimizing the operating cost of this embodiment would be to maximize the solids volume fraction of salt crystals in the salt slurry suspension 52 that is being pumped downhole. However, when the solids volume fraction is too high for the given pumping and formation conditions, the risk of screen outs (extensive particle-particle-fracture well bridging) exists. Screen outs can lead to excessive pressures and premature termination of the operation. The variables involved in maximizing the solid volume fraction of a treatment include: 1) the particle size distribution of the solids, 2) the concentration of the solids, 3) the rheological properties of the fluid, 4) the pumping rate, and 5) the mechanical properties of the formation, and 5) the permeabilities of the formations being hydraulically fractured.

There is significant industrial knowledge, engineering methodologies, and software (such as the Kinetix suite of fracture design software) available for designing the solids volume fraction program for a conventional hydraulic fracturing fluid that can be safely pumped. This knowledge from hydraulic fracturing may be used by the process control system 54 to set the material specifications for the salt slurry suspension 52. For example, the salt slurry suspension 52 may be specified by the process control system 54 to be comprised of very fine (e.g., less than 100 mesh, in certain embodiments) salt crystals. Another method may be to specify a multimodal particle size distribution, which remains fluid at very high solids volume fraction. The specifications for the salt slurry suspension 52 may then be used by the process control system 54 to set the equipment and operating requirements for the salt slurry suspension preparation system 62 of the oilfield brine processing system 46.

In certain embodiments, a composition, concentration, viscosity, salinity, and/or density of dissolved salts in the oilfield brine feedstocks 48A, 48B, 48C, 48D, 48E and the resulting salt slurry suspension 52 may be monitored by the process control system 54 throughout the processing of the oilfield brine feedstocks 48A, 48B, 48C, 48D, 48E by the oilfield brine processing system 46 to properly calculate, for example, appropriate bottom hole pressures during reinjection of the salt slurry suspension 52. To that end, as illustrated in FIGS. 4 and 8, in certain embodiments, the desalination/crystallization system 60 and the salt slurry suspension preparation system 62 may include sensors 56 similar to the sensors 56A, 56B, 56C, 56D, 56E that detect certain properties (e.g., composition, concentration, viscosity, salinity, and/or density of dissolved salts) of corresponding oilfield brine feedstocks 48A, 48B, 48C, 48D, 48E to detect similar properties of the salt slurry suspension 52 during processing via the desalination/crystallization system 60 and the salt slurry suspension preparation system 62.

In general, it is relatively important that the solid state salts and the liquid phase of the salt slurry suspension 52 are either: 1) close to chemical equilibrium during the pumping operation, or 2) that any dissolution or precipitation reactions that occur do not cause a lock-up of the salt slurry suspension 52 during pumping (i.e., that they do not set up the salt slurry suspension 52 like a cement). In certain embodiments, the reactive behavior of the salt slurry suspension 52 may be modeled by the process control system 54 using tools like OLI StreamAnalyzer (e.g., for predicting chemical composition and phase behavior, and so forth) coupled with reservoir and fracturing simulator inputs of temperature and pressure transients during operations. Once the composition and phase behaviors of the salt slurry suspension 52 are modeled and predicted by the process control system 54, the salt slurry suspension 52 may be tuned by adding chemical additives (e.g., acids and bases to adjust the pH, scale inhibitors to control the rate of precipitation reactions, and so forth) to the salt slurry suspension 52 within the salt slurry suspension preparation system 62 based on control signals from the process control system 54 to ensure that the salt slurry suspension 52 behaves well during operations.

Returning now to FIG. 7, in certain embodiments, the method 78 may also include selection of candidate wells 22 for stress diversion treatments using the salt slurry suspension 52 (block 86), which may be engineered by the process control system 54 of the oilfield brine processing system 46.

The problem of "frac-hits" between daughter and parent wells 22, whereby hydraulic fractures in daughter wells 22 grow into the depleted pressure region of parent wells 22, has relatively recently become a problem for infill drilling campaigns and field development in general. In such situations, not only is the production from the parent well 22 negatively impacted, but fresh rock is often bypassed, and not stimulated. Using the embodiments described herein, the depleted wells 22, or regions of the depleted wells 22, may be re-fractured with the salt slurry suspension 52 produced by the oilfield brine processing system 46. Since the salt slurry suspension 52 will fill the hydraulic fractures with solid salt when reinjected, the resultant fractures will create a stress shadow in the same manner as conventional fractures. Furthermore, the liquid that leaks off in these operations will increase the local pore pressure as well. Engineering workflows, tools, and software may be used by the process control system 54 for optimizing the engineering of stress diversion programs. For example, tools such as Petrel, Visage, and the Kinetix series of hydraulic fracturing simulators may be used by the process control system 54 for recognition of candidate wells 22 and stress diversion treatment design. As such, in certain embodiments, the process control system 54 may select one or more candidate wells 22 for reinjection of the salt slurry suspension 52 by determining one or more stress diversion treatments configured to create stress shadowing in the formation 14 to increase production (and/or to create favorable hydraulic fracturing conditions) from one or more producing wells 22 (or a future well to be drilled at the well site 10).

Finally, in certain embodiments, the method 78 may include reinjection of the salt slurry suspension 52 into a formation 14 via a selected candidate well 22 (block 88). In certain embodiments, the salt slurry suspension 52 may be formulated and injected into hydrocarbon-producing formations 14 above hydraulic fracturing pressure to intentionally create regions of localized high stress. The embodiments described herein may utilize stress diversion in many advantageous ways including, but not limited to, creating intentionally stressed regions in a reservoir 16 to prevent adverse hydraulic fracture growth from daughter wells 22 during infill drilling programs.

In addition, the embodiments described herein also provide techniques that reconcile two conflicting requirements for efficient SWD operation: (1) judicious use of reservoir volume in the SWD asset, and (2) preserving injectivity of the SWD wells 44. First, from a chemistry perspective, SWD wells 44 exist to sequester the hazardous salts and chemicals that are dissolved in produced oilfield brine. The water molecules themselves, $H_2O$, are not a problem for either the surface environment or human health. However, pumping dilute brines into SWD wells 44 with excess water not only wastes the storage space inside the receiving formation, but also wastes energy and may exacerbate reservoir pressures and stresses that degrade drilling conditions and induce seismicity. Therefore, from a reservoir storage perspective, it is best to pump concentrated brines into SWD wells 44. As such, desalination technologies that effectively strip excess water from the brine before disposal may help preserve the lifespan of an SWD asset and mitigate the catastrophic consequences of over-pressuring the receiving formation.

One additional benefit is that the desalinated water stripped from the produced brine by the embodiments described herein may be routed to beneficial uses at the earth's surface. Since the water is desalinated, and since the harmful components are concentrated for sequestration in the SWD asset, this stripped water may be made safe for surface use or discharge. The desalinated water, or "fresh" water produced by these embodiments may be used for multiple beneficial purposes, including industrial, agricultural, and environmental restoration. This beneficial use of desalinated water at the surface is naturally coupled with the beneficial reduction of fluid volumes destined for a SWD asset, thereby increasing the economic value created by these embodiments.

However, a second key issue for maintaining SWD asset value is to preserve well injectivity and prevent reservoir damage—especially in the region immediately surrounding the wellbore. In contrast to the storage perspective described above, this requirement proscribes a conservative approach towards managing total dissolved solid (TDS) composition and concentrations. Injecting brines at TDSs near or exceeding their saturation point may easily lead to scale formation and the precipitation of suspended solids—both of which may damage the rock face permeability. Furthermore, produced oilfield brines are expected to be highly variable in composition, therefore TDS concentration spikes, and upsets may be expected when the oilfield brines for the SWD well are sourced from many different hydrocarbon-producing wells 22. From this perspective, it is much better to inject more dilute brines into the SWD formation that are less susceptible to salt precipitation under highly variable conditions.

Figure 9:
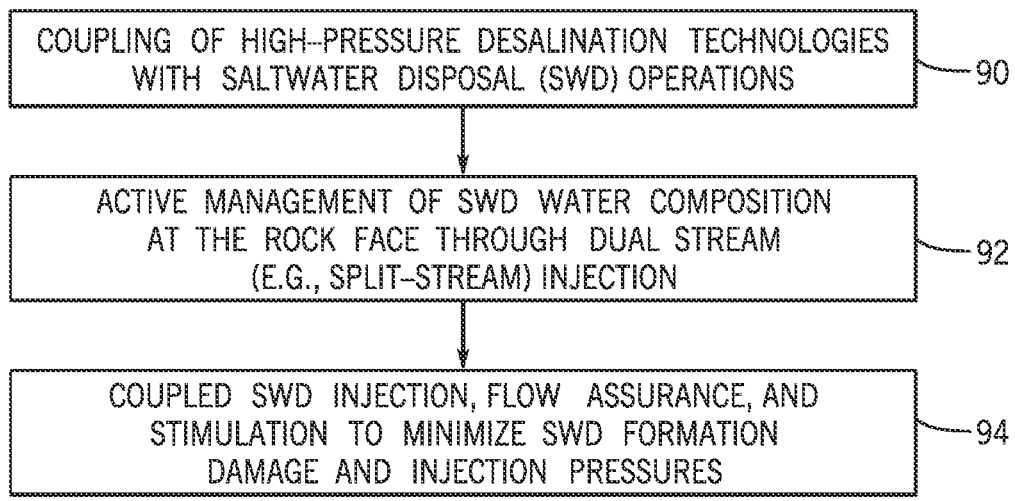
FIG. 9 illustrates three distinct operations of a WHD system, which may be performed independently or jointly, in accordance with embodiments of the present disclosure.

The embodiments described herein provide techniques that reconcile the above two conflicting requirements. Furthermore, the embodiments described herein enable energy efficiency by coupling desalination with SWD operations. In particular, as is illustrated in FIG. 9, the embodiments described herein include three distinct operations 90, 92, 94 that may be operated independently or jointly. All three operations 90, 92, 94 offer operational and economic benefits when practiced individually, but they are synergetic and may offer substantial gains in efficiency when practiced jointly. Efficiency may be measured in three ways: (1) a reduction of the total energy required for both desalination and SWD operations, (2) a reduction in the total volume of water being injected into the targeted SWD formations while creating a desalinated stream of water for beneficial reuse, and (3) reduced permeability damage and, hence, reduced rock face pressures, within the SWD wells 44 while operating at relatively high TDS concentrations.

The first operation 90 of the three operations described herein is the coupling of high-pressure desalination technologies, such as membrane-based desalination technologies including, for example, reverse osmosis (RO), with SWD operations. Although primarily described herein as utilizing RO-based technologies, in other embodiments, other types of desalination technologies may be utilized. In general, relatively high pressures are required for both SWD well operations and for desalinating brine across RO membranes. SWD operations normally operate at pressures above the formation hydrostatic pressure, and below the fracturing pressure of the SWD formation. The pressures required for RO depend on the salinity (or, more correctly, the chemical potential of the water) being treated. Much of the energy costs for both desalination and SWD operations are tied to the energy required to operate these pumps. The embodiments described herein use the same pumps to generate pressures for both RO operations and SWD injection. In certain embodiments, the RO membranes may be located between the pumping system and the SWD wellhead, upstream of the pumping system and the SWD wellhead, within a pumping system, within wellbores of SWD wells, or some combination thereof, where the RO membranes may skim off a stream of desalinated water (also useful for surface beneficial reuse) and, thereby, reduce the total volume of water being injected into the targeted disposal formation. As used herein, the term "desalinated water" is intended to mean water from which a significant fraction of the salts has been removed, and that exists in a liquid phase, a vapor phase (e.g., water evaporated from the salt suspension), or some combination thereof.

One advantage of this is that it enables a fast response of the SWD system to rapidly changing source water salinities. For example, if a high concentration slug of water enters the facility, it may be shuttled directly to the SWD well 44 and bypass the desalination unit. Furthermore, in certain embodiments, reserved desalinated water from previous operations could be injected into the line to help prevent scale precipitation. Alternatively, in certain embodiments, the RO facility may take more of the load when the feedstock produced water is dilute. Under these conditions, desalinated water for beneficial reuse may be produced under energetically favorable conditions. In certain embodiments, RO membranes may be located downhole to take advantage of the hydrostatic pressure in the wellbore.

The second operation 92 of the three operations described herein is active management of the SWD water composition at the rock face through dual stream (e.g., split-stream) injection. In certain embodiments, two streams of water may be injected into the wellbore and/or formation. The first stream, the bulk of the water, would be the high concentration stream, which is operated at a concentration close to, or in some cases in excess of, the precipitation concentration of the dissolved species. The second stream (e.g., the control stream) would be a small flow rate of desalinated water (e.g., skimmed from the RO stream) to precisely control the composition of the water entering the rock face. This dual stream configuration may be operated to maximize the amount of salt being disposed of in the formation, while minimizing the total volume of water needing disposal.

The third operation 94 of the three operations described herein is coupled SWD injection, flow assurance, and stimulation to minimize formation damage and injection pressures. This operation is similar to the second operation 92 described above, but adds in chemical stimulation and scale prevention to: (1) improve control on the wellhead pressure of the injector well, and (2) minimize the impact of near-wellbore damage to the SWD formation immediately surrounding the SWD wellbore, so that any damage occurs further out in the SWD formation. This operation may be performed either continuously or intermittently.

These three operations 90, 92, 94 reduce the total volume of fluids injected into SWD wells 44, thereby prolonging the value of an SWD well asset. Furthermore, the operations 90, 92, 94 provide a stream of desalinated water useful for surface operations. In certain embodiments, these operations 90, 92, 94 may be predicated on detailed knowledge of the composition of water in the disposal stream, as described herein.

The overall energy efficiency of produced water management operations described herein may be improved by coupling RO desalination processes to SWD well injection, since both energy intensive processes require raising the working fluid to an elevated pressure. Rather than dissipating much of the energy expended during desalination, the energy may be reused immediately to drive brine injection into an SWD well 44. The brine being injected into an SWD wellhead needs to be raised to an elevated pressure in order to overcome both the inherent reservoir pressure in the target SWD formation, and the rate-dependent opposing friction pressure generated by the fluid traveling down the wellbore of the SWD well 44. In RO desalination systems, a feed brine is effectively deconstructed into: 1) a low salinity or "fresh" desalinated water (or permeate), and 2) a high salinity "waste" brine (that is at a higher salinity than the feed brine. The feed brine needs to be raised to an elevated pressure to overcome the chemical potential of water in the brine when driving a portion of the fluid across the semi-permeable membrane. However, the high salinity "waste" brine also remains at an elevated high pressure and still contains the mechanical potential energy put into it when it was pressurized. Since, in oilfield operations, this waste brine is eventually destined for injection into SWD wells 44, it is economically beneficial not to waste this stored energy, but to use it to drive the brine down the SWD wellbore.

Figure 10:
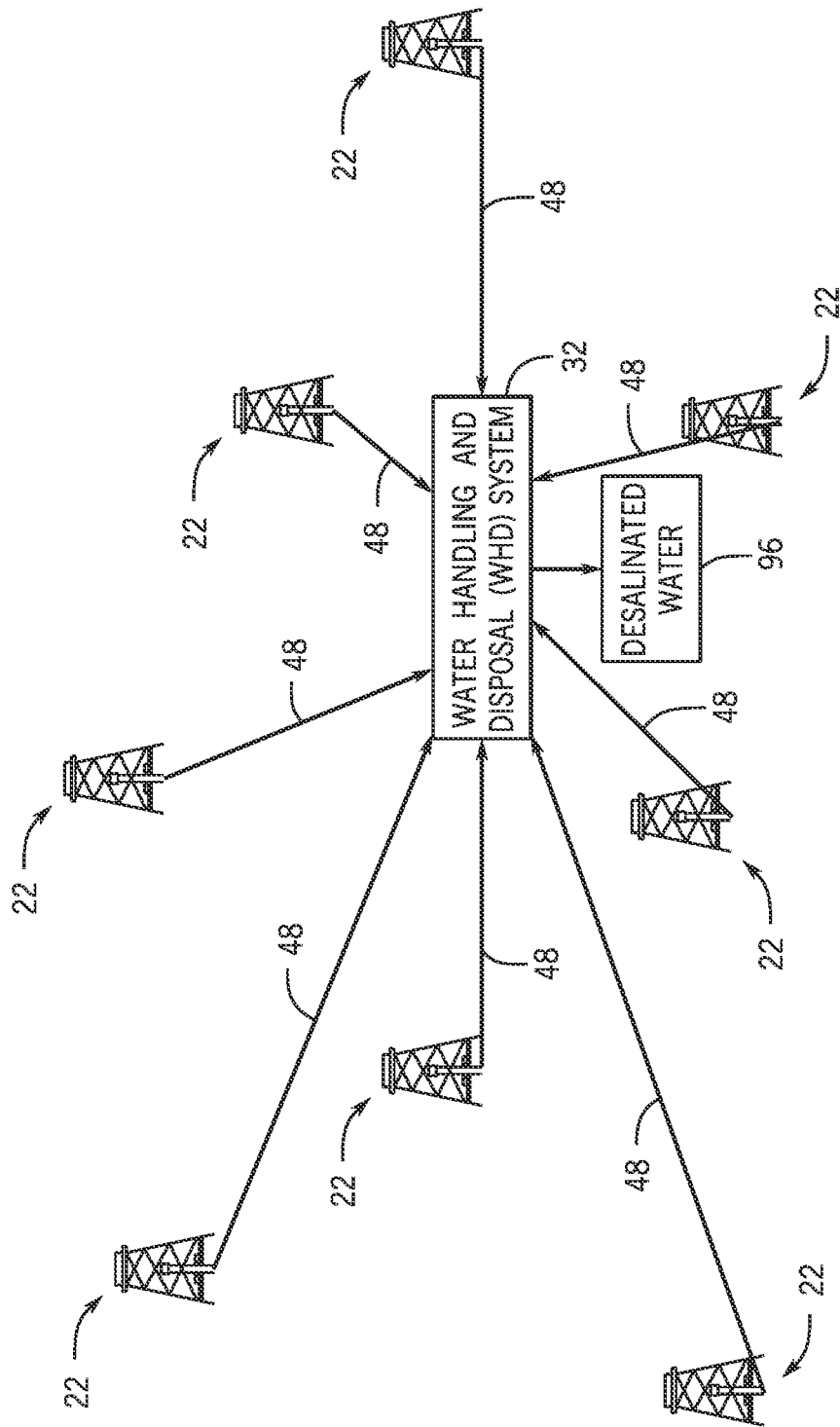
FIG. 10 illustrates a WHD system configured to receive oilfield brine from hydrocarbon-producing wells and to process and dispose of portions of the oilfield brine using the operations illustrated in FIG. 9, in accordance with embodiments of the present disclosure.

However, coupling RO desalination and SWD well operations is not trivial because the performance characteristics, and the pressure requirements, of both systems are highly dependent on feed brine composition, and the overall volumetric flow rates through the system. This input into the system (see, e.g., FIG. 11) is dynamic, and highly time-dependent and variable flowrates and composition of the brines coming from many wells 22 (FIG. 10). Furthermore, the ideal operating pressures (e.g., feed pressure, internal pressures, and output pressures) required for desalination and SWD injection are independent of each other. For example, the wellhead pressure of an SWD well 44 generally depends on both the desired rate of injection, and on the composition and density of the brine being injected because of friction pressure in the wellbore of the SWD well 44. Likewise, the pressure required for RO operations depends in part on the quality (e.g., TDS, density, and so forth) of the feed brine. The embodiments described herein balance SWD well operation and desalination operation requirements in substantially real time by the active control of 1) composition, 2) flow rates, and 3) pressures of the brine as it passes through the system (see, e.g., FIG. 11).

A number of control operations manage the compositions, flow rates, and pressures of the brines at different points in the process. One control operation selects and blends the composition of the feed brine for the desalination operation. This operation selects produced brines from a plurality of hydrocarbon-producing wells, and blends the best possible composition for the desalination operation. In certain embodiments, the produced brines from the plurality of hydrocarbon-producing wells may be pre-treated (e.g., removal of oil and grease, dissolved organics, chemical scale treatment, the addition of biocides, and so forth), either individually or in aggregate. These pre-treatment steps may also be managed by the control operation. The control operation also selects the brines that will bypass the desalination operation and be directly routed to an SWD well 44. A second control operation involves balancing flow rates and pressure requirements of the desalination system with the required flow rates and injection pressures at the SWD wellhead of an SWD well 44. The pressure system may use multiple components, and may involve pumps upstream of the desalination system, booster pumps between the desalination system and the wellhead, energy harvesting systems, and so forth. Various chokes, check valves, pressure release values, backpressure regulators, and other flow control devices may also be used to manage the pressures at various points along the pressure system.

FIG. 10 illustrates a WHD system 32 configured to receive oilfield brine 48 from a plurality of hydrocarbon-producing wells 22 and to process and dispose of portions of the oilfield brine 48 using the operations 90, 92, 94 illustrated in FIG. 9. The oilfield brine 48 produced by the hydrocarbon-producing wells 22 may be conveyed (e.g., via pipelines 34, in certain embodiments) to the WHD system 32 for processing and disposal (e.g., injection into one or more SWD wells 44 of the WHD system 32), as described in greater detail herein. In addition, as also described in greater detail herein, in certain embodiments, the oilfield brine 48 may be processed by the WHD system 32 to produce desalinated water 96, which may be beneficially reused.

Figure 11:
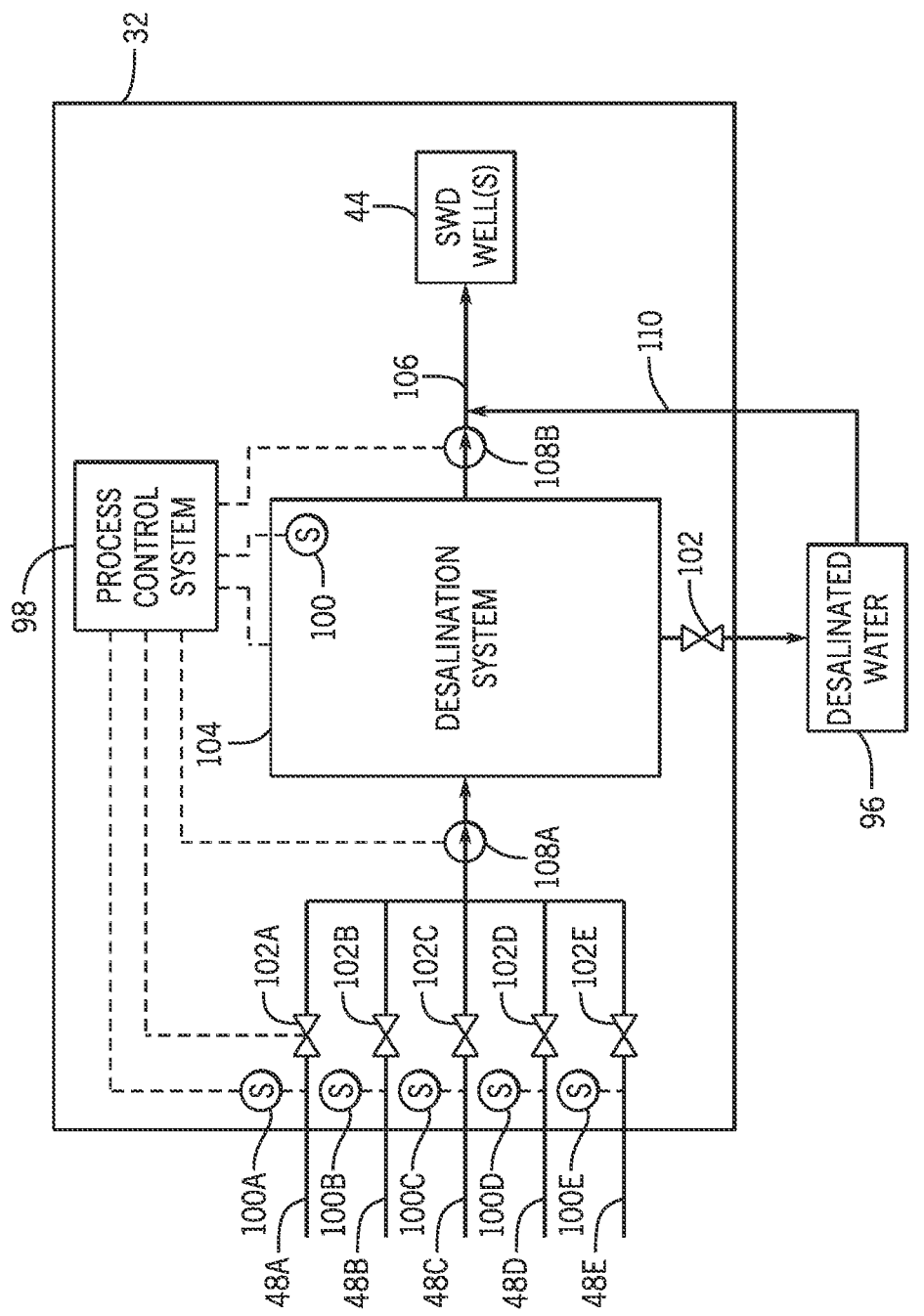
FIG. 11 is a schematic diagram of the WHD system of FIG. 10, which includes the coupling of high-pressure desalination technologies, such as reverse osmosis (RO), with SWD operations, in accordance with embodiments of the present disclosure.

FIG. 11 is a schematic diagram of the WHD system 32 of FIG. 10. As illustrated, in certain embodiments, the WHD system 32 may receive a plurality of oilfield brine feedstocks 48A, 48B, 48C, 48D, 48E (e.g., from a plurality of respective hydrocarbon-producing wells 22 via pipelines 34, as illustrated in FIG. 10) and may select one or more of the oilfield brine feedstocks 48A, 48B, 48C, 48D, 48E produced in the field for processing. For example, in certain embodiments, a process control system 98 may use corresponding sensors 100A, 100B, 100C, 100D, 100E to detect certain properties (e.g., composition, concentration, viscosity, salinity, and/or density of dissolved salts) of the oilfield brine feedstocks 48A, 48B, 48C, 48D, 48E and, based at least in part on the detected properties, may actuate (e.g., send control signals to open/close) corresponding valves 102A, 102B, 102C, 102D, 102E to control blending of the oilfield brine feedstocks 48A, 48B, 48C, 48D, 48E for delivery to a desalination system 104, which may be used to transform the blended oilfield brine feedstocks 48A, 48B, 48C, 48D, 48E into desalinated water 96 and saltwater 106 for injection into one or more SWD wells 44, as described in greater detail herein. As used herein, the term "saltwater" is intended to mean any of the water sources described herein, such as the oilfield brines and other brines, which have an elevated salinity as compared to the desalinated water 96.

The desalination system 104 may utilize high-pressure membrane-based desalination technologies, such as reverse osmosis (RO) in certain embodiments. However, in other embodiments, the desalination system 104 may utilize other desalination processes, such as salt crystallization and zero liquid discharge (ZLD) technologies (or even evaporation ponds). In addition, although a plurality of valves 102A, 102B, 102C, 102D, 102E are illustrated in FIG. 11 as controlling the blending of the oilfield brine feedstocks 48A, 48B, 48C, 48D, 48E, in other embodiments, other processing equipment, such as pumps, heating elements, and so forth, may be actuated by the process control system 98 to at least partially control the blending of the oilfield brine feedstocks 48A, 48B, 48C, 48D, 48E.

Once the oilfield brine feedstocks 48A, 48B, 48C, 48D, 48E have been selected for processing by the process control system 98 and blended based on the control of the corresponding valves 102A, 102B, 102C, 102D, 102E (or other processing equipment), the resulting blended oilfield brine delivered to the desalination system 104 may be desalinated to produce the desalinated water 96 (e.g., for surface reuse) and the saltwater 106 (e.g., for injection into one or more SWD wells 44), as described in greater detail herein. In certain embodiments, delivery of the flow of the saltwater 106 from the desalination system 104 to the one or more SWD wells 44 may be controlled by the process control system 98 by actuating (e.g., sending control signals to) the pumping system 108.

In the embodiment illustrated in FIG. 11, the pumping system 108 includes one or more primary pumps 108A located upstream of the desalination system 104 and the one or more SWD wells 44 and one or more booster pumps 108B located downstream of the desalination system 104 but upstream of the one or more SWD wells 44. However, in other embodiments of the pumping system 108 may include various other equipment including, but not limited to, energy harvesting systems, various chokes, check valves, pressure release values, backpressure regulators, and other flow control devices. In addition, although illustrated in FIG. 11 as including a pumping system 108 that is separate from a desalination system 104, in other embodiments, the pumping system 108 and the desalination system 104 may be at least partially integrated with each other. Indeed, all of the equipment of the WHD system 32 illustrated in FIG. 11 may be integrated with (or separate from) each other in different combinations than illustrated, for all of the embodiments described herein. For example, in certain embodiments, the valves 102 may be integrated into the pumping system 108 and/or the desalination system 104.

It will be appreciated that the embodiment of the WHD system 32 illustrated in FIG. 11 illustrates the first operation 90 of the three operations described with respect to FIG. 9, which includes the coupling of high-pressure desalination technologies, such as reverse osmosis (RO), with SWD operations. As described above, in general, relatively high pressures are required to pump oilfield brines into SWD wells 44. In particular, SWD operations normally operate at pressures above the formation hydrostatic pressure, and below the fracturing pressure of the SWD formation. In addition, relatively high pressures are also generally required for desalinating oilfield brines across RO membranes. In general, the pressures required for RO depend on the salinity (or, more correctly, the chemical potential of the water) being treated. Accordingly, much of the energy costs for both desalination and SWD operations are tied to the energy required to operate these pumps. The embodiments described herein use the same pumping system 108 to generate pressures for both RO operations via the desalination system 104 and SWD injection into one or more SWD wells 44, thereby reducing the total energy required for the combined desalination and SWD operations. As illustrated in FIG. 11, the desalination system 104 may skim off a stream of desalinated water 96 (e.g., useful for surface beneficial reuse) from the oilfield brine feedstocks 48A, 48B, 48C, 48D, 48E and, thereby, reduce the total volume of water being injected into the targeted SWD formation while also creating a desalinated stream of water 96 for beneficial reuse.

Accordingly, the WHD system 32 illustrated in FIG. 11 is capable of quickly responding to rapidly changing salinities of the oilfield brine feedstocks 48A, 48B, 48C, 48D, 48E. For example, in certain embodiments, if a particular oilfield brine feedstock 48 is received by the WHD system 32, it may be delivered directly to an SWD well 44 for injection and bypass the desalination system 104. Furthermore, as illustrated in FIG. 11, in certain embodiments, reserved desalinated water 96 from previous operations may be injected into the stream of saltwater 106, as illustrated by arrow 110, prior to injection of the saltwater 106 into one or more SWD wells 44 to help prevent scale precipitation.

Figure 12:
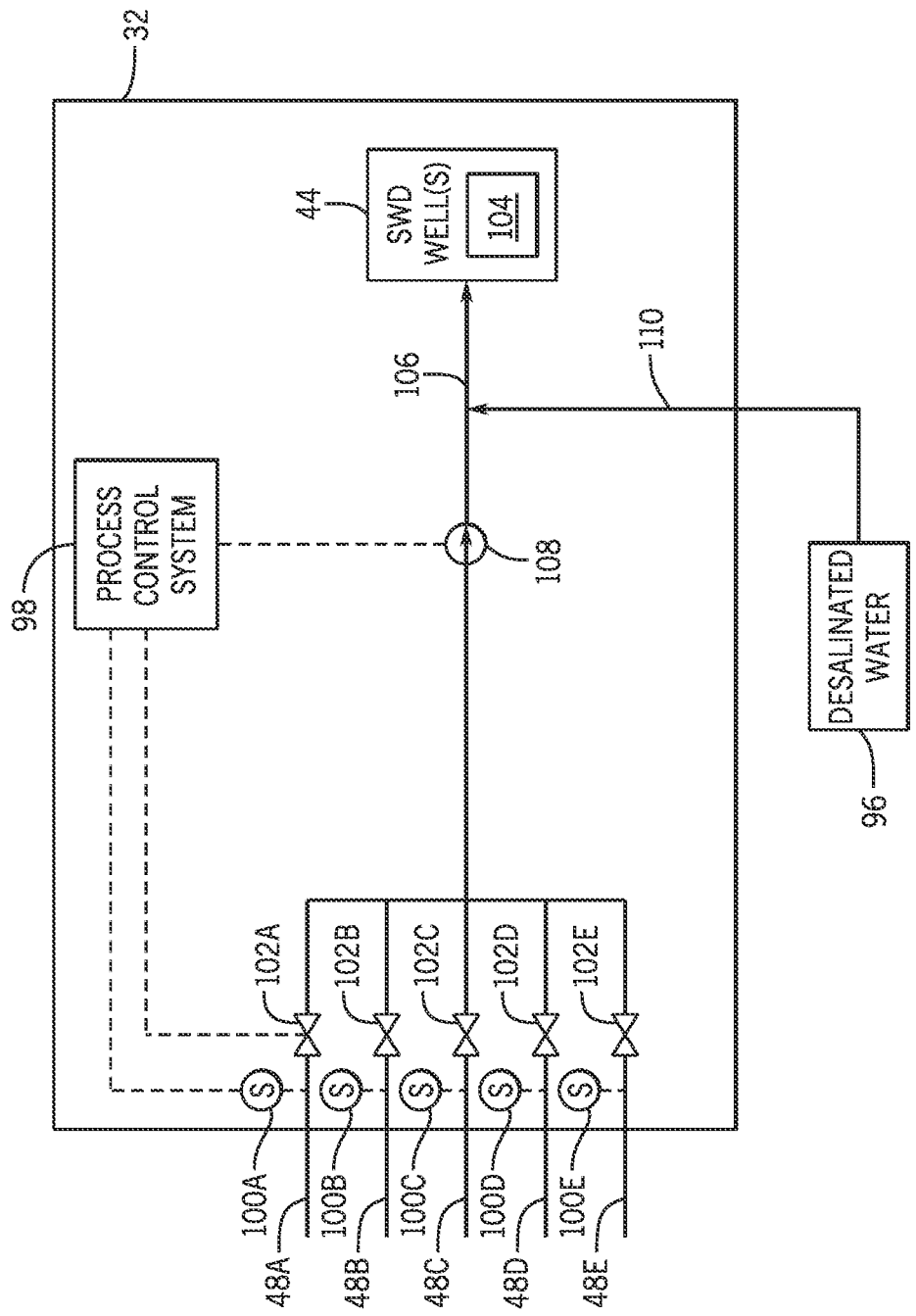
FIG. 12 is a schematic diagram of the WHD system of FIG. 10, which includes at least a portion of a desalination system disposed within one or more wellbores of one or more SWD wells, in accordance with embodiments of the present disclosure.

In addition, although illustrated in FIG. 11 as being located upstream of the SWD well(s) 44 (e.g., at a surface location), in other embodiments, RO membranes (e.g., the desalination system 104) may be located downhole within the SWD well(s) 44 to take advantage of the hydrostatic pressure in the wellbores of the SWD well(s) 44. For example, FIG. 12 is a schematic diagram of the WHD system 32 of FIG. 10, which includes at least a portion of a desalination system 104 located within one or more wellbores of one or more SWD wells 44. In addition, in certain embodiments, at least a portion of the desalination system 104 may be located both at a surface location as well as within one or more wellbores of one or more SWD wells 44.

Figure 13:
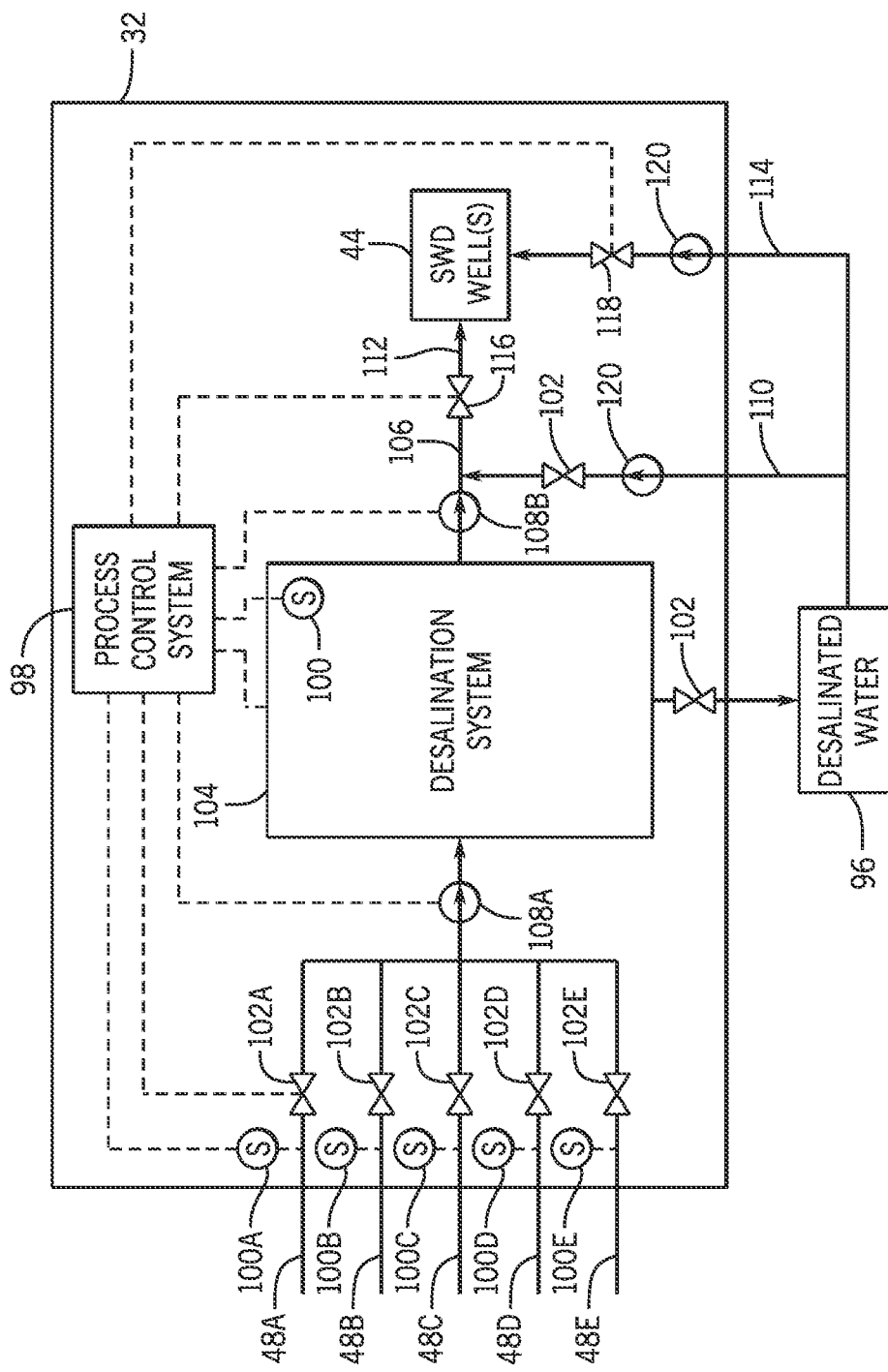
FIG. 13 is a schematic diagram of the WHD system of FIG. 11 with the addition of active management of SWD water composition at the rock face through dual stream (e.g., split-stream) injection into one or more SWD wells, in accordance with embodiments of the present disclosure.

FIG. 13 is a schematic diagram of the WHD system 32 of FIG. 11 with the addition of the second operation 92 of the three operations described with respect to FIG. 9, which includes active management of the SWD water composition at the rock face through dual stream (e.g., split-stream) injection into one or more SWD wells 44. In particular, as illustrated in FIG. 13, in certain embodiments, two streams of water 112, 114 may be injected into the wellbore(s) of one or more SWD wells 44. The first stream 112 (e.g., the saltwater 106 from the desalination system 104), the bulk of the water, has a relatively high concentration of TDSs, which is operated at a concentration close to or, in some instances, in excess of, the precipitation concentration of the dissolved species. The second stream 114 (e.g., the control stream) may be a small flow rate of desalinated water 96 (e.g., skimmed from the first stream by the desalination system 104) to precisely control the compositions of the water 112, 114 entering the rock face of the one or more SWD wells 44.

The dual stream configuration illustrated in FIG. 13 may be operated by the process control system 98 to maximize the amount of salt being located in the formation(s) of one or more SWD wells 44, while minimizing the total volume of water needing disposal. For example, the process control system 98 may control alternating injection of the first and second streams 112, 114 and/or metered (e.g., simultaneous) injection of the first and second streams 112, 114 based on a ratio of the first and second streams 112, 114 that is determined by the process control system 98 based at least in part on one or more properties (e.g., composition, concentration, viscosity, salinity, and/or density of dissolved salts) of one or more oilfield brine feedstocks 48A, 48B, 48C, 48D, 48E detected by one or more sensors 100.

As illustrated in FIG. 13, in certain embodiments, respective valves 116, 118 may be controlled by the process control system 98, for example, based on feedback relating to properties (e.g., composition, concentration, viscosity, salinity, and/or density of dissolved salts) of the received oilfield brine feedstocks 48A, 48B, 48C, 48D, 48E and/or the saltwater 106 produced by the desalination system 104 (e.g., as detected by the sensors 100A, 100B, 100C, 100D, 100E and/or 100, respectively). In addition, in certain embodiments, one or more desalinated water pumps 120 may be controlled by the process control system 98 to pump desalinated water 96 (i.e., the second stream 114) into the wellbore(s) of one or more SWD wells 44, for example, alternatingly between injections of saltwater 106 (i.e., the first stream 112) into the wellbore(s) of the one or more SWD wells 44 and/or in a metered fashion during injection of the saltwater 106 (i.e., the first stream 112) into the wellbore(s) of the one or more SWD wells 44. As such, the composition, flow rates, and pressures of the two streams of water 112, 114 may be actively controlled by the process control system 98, for example, based at least in part on feedback relating to properties (e.g., composition, concentration, viscosity, salinity, and/or density of dissolved salts) of the received oilfield brine feedstocks 48A, 48B, 48C, 48D, 48E and/or the saltwater 106 produced by the desalination system 104 (e.g., as detected by the sensors 100A, 100B, 100C, 100D, 100E and/or 100, respectively).

As described herein, although illustrated in FIG. 13 as combining the first and second operations 90, 92 of the three operations described with respect to FIG. 9, in other embodiments, the dual stream configuration illustrated in FIG. 13 may be performed independently of the embodiment in FIG. 11. For example, in such an embodiment, one or more received oilfield brine feedstocks 48A, 48B, 48C, 48D, 48E and desalinated water 96 from any water source may be controlled by the process control system 98 as the two streams of water 112, 114. In other words, in certain embodiments, the active management of the two streams of water 112, 114 illustrated in FIG. 13 may be performed with or without a desalination system 104.

Figure 14:
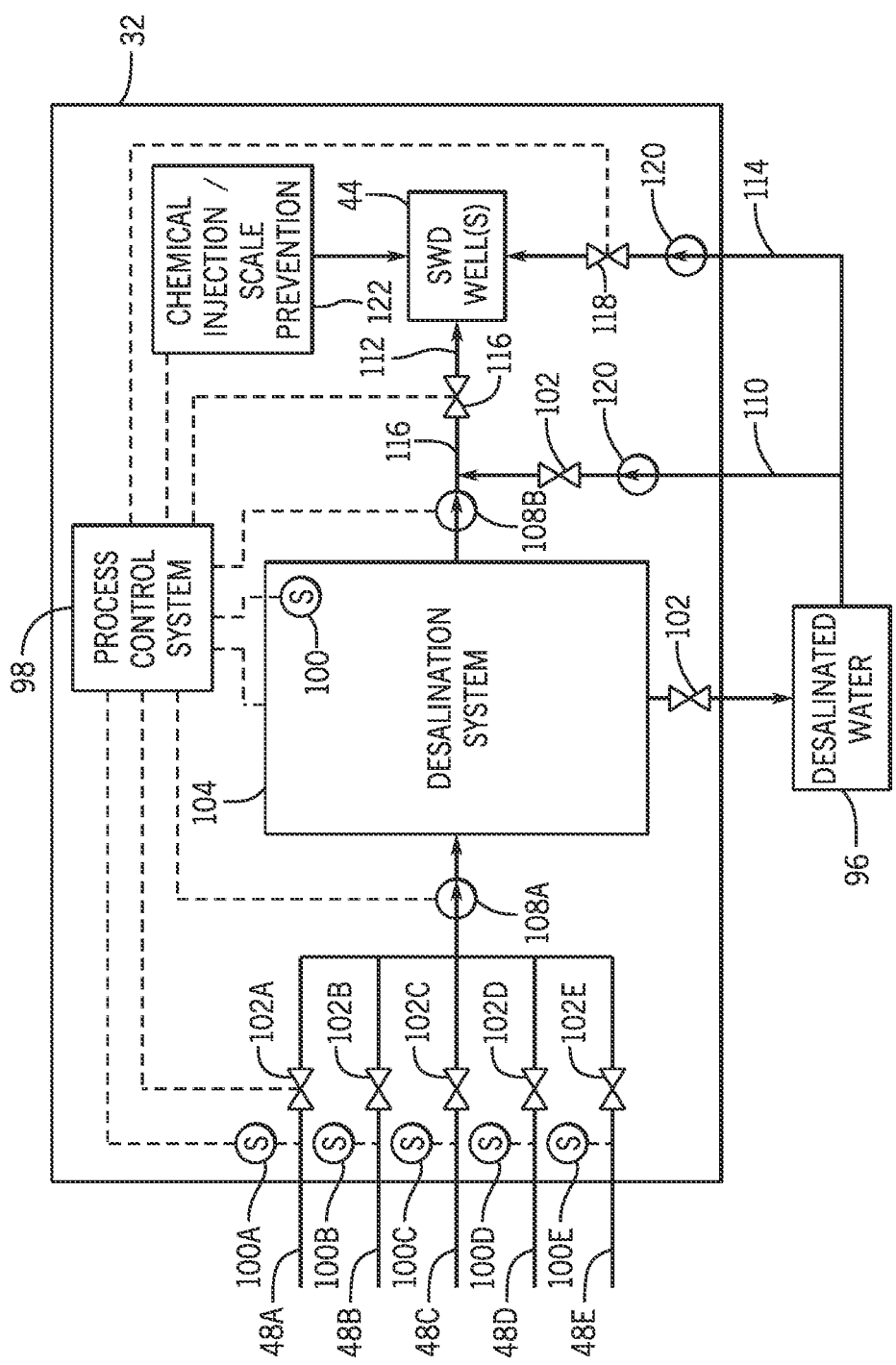
FIG. 14 is a schematic diagram of the WHD system of FIG. 13 with the addition of coupled SWD injection, flow assurance, and stimulation to minimize formation damage and injection pressures, in accordance with embodiments of the present disclosure.

FIG. 14 is a schematic diagram of the WHD system 32 of FIG. 13 with the addition of the third operation 94 of the three operations described with respect to FIG. 9, which includes coupled SWD injection, flow assurance, and stimulation to minimize formation damage and injection pressures. This operation is similar to the second operation 92 described herein, but adds in chemical stimulation and scale prevention processes 122 with respect to the SWD well(s) 44, which may be controlled by the process control system 98, to: (1) improve control on the wellhead pressure of the SWD well(s) 44, and (2) minimize the impact of near-wellbore damage to the SWD formation immediately surrounding the SWD wellbore, so that any damage occurs further out in the SWD formation. In certain embodiments, the chemical stimulation and scale prevention processes 122 may be performed either continuously or intermittently, for example, relative to the injection of saltwater 106 into the SWD well(s) 44. As described herein, although illustrated in FIG. 14 as combining the first, second, and third operations 90, 92, 94 of the three operations described with respect to FIG. 9, in other embodiments, the chemical stimulation and scale prevention processes 122 illustrated in FIG. 14 may be performed independently of the embodiments in FIGS. 11 and 13. For example, in such an embodiment, the chemical stimulation and scale prevention processes 122 may be performed with respect to conventional saltwater injection into one or more SWD wells 44.

Figure 15:
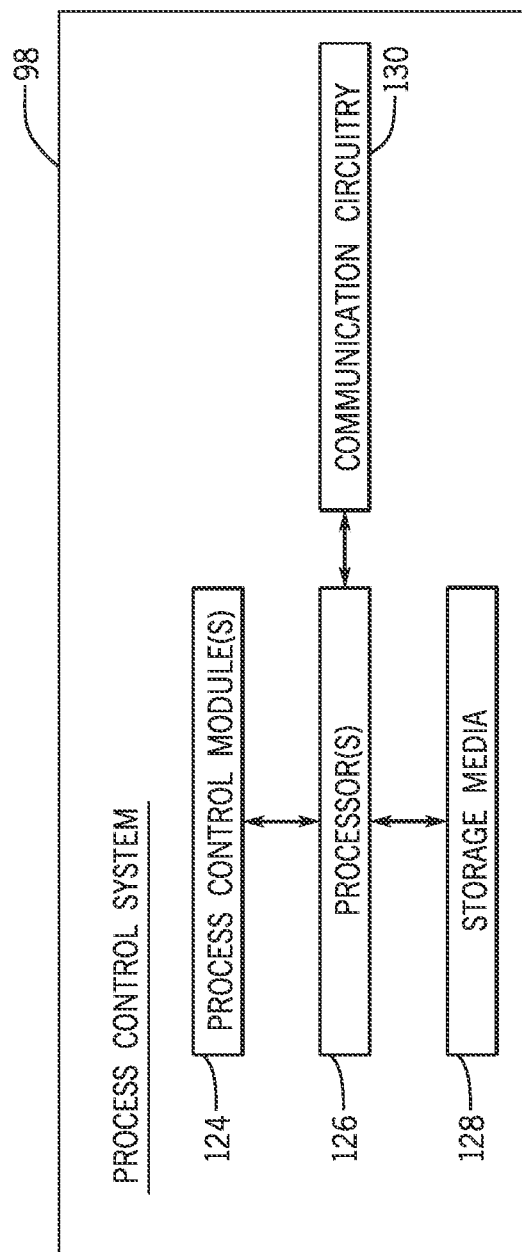
FIG. 15 is a schematic diagram of a process control system of the WHD system of FIGS. 11-14, in accordance with embodiments of the present disclosure.

FIG. 15 is a schematic diagram of a process control system 98 of the WHD system 32 of FIGS. 11-14. As illustrated in FIG. 15, in certain embodiments, the process control system 98 of the WHD system 32 described herein may include one or more process control modules 124 (e.g., a program of computer-executable instructions and associated data) that may be configured to perform various functions of the embodiments described herein. In certain embodiments, to perform these various functions, a process control module 124 executes on one or more processors 126 of the process control system 98, which may be connected to one or more storage media 128 of the process control system 98. Indeed, in certain embodiments, the one or more process control modules 124 may be stored in the one or more storage media 128 of the process control system 98.

In certain embodiments, the one or more processors 126 of the process control system 98 may include a microprocessor, a microcontroller, a processor module or subsystem, a programmable integrated circuit, a programmable gate array, a digital signal processor (DSP), or another control or computing device. In certain embodiments, the one or more storage media 128 of the process control system 98 may be implemented as one or more non-transitory computer-readable or machine-readable storage media. In certain embodiments, the one or more storage media 128 of the process control system 98 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the process control module(s) 124 may be provided on one computer-readable or machine-readable storage medium of the storage media 128 of the process control system 98, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the one or more storage media 128 of the process control system 98 may be located either in the machine running the machine-readable instructions, or may be located at a remote site from which machine-readable instructions may be downloaded over a network for execution.

In certain embodiments, the processor(s) 126 of the process control system 98 may be connected to communication circuitry 130 of the process control system 98 to allow the process control system 98 to communicate with the desalination system 104, as well as the various sensors 100, valves 102, 116, 118, equipment of the pumping system 108, the desalinated water pumps 120, and other processing equipment of the WHD system 32, and so forth, for the purpose of controlling operation of the WHD system 32, as described in greater detail herein.

In certain embodiments, the communication circuitry 130 of the process control system 98 may be, include, or be implemented by various types of standard interfaces, such as an Ethernet interface, a universal serial bus (USB), a third generation input/output (3GIO) interface, a wireless interface, a cellular interface, and/or a satellite interface, among others. In certain embodiments, the communication circuitry 130 of the process control system 98 may also include a communication device, such as a modem or network interface card to facilitate exchange of data with external computing devices via a network (e.g., Ethernet connection, digital subscriber line (DSL), telephone line, coaxial cable, cellular telephone system, satellite, etc.).

The one or more process control modules 124, when executed by the one or more processors 126 of the process control system 98, may cause the process control system 98 to perform various functions of the embodiments described herein. For example, in certain embodiments, the process control system 98 may be configured to actuate (e.g., send control signals to) the desalination system 104, as well as the various valves 102, 116, 118, equipment of the pumping system 108, the desalinated water pumps 120, and other processing equipment of the WHD system 32, and so forth, to control the composition of the saltwater 106 (and/or desalinated water 96) injected into one or more SWD wells 44 based at least in part on one or more properties (e.g., composition, concentration, viscosity, salinity, and/or density of dissolved salts) of one or more oilfield brine feedstocks 48A, 48B, 48C, 48D, 48E detected by one or more sensors 100, as described in greater detail herein.

In addition, in certain embodiments, the process control system 98 may be configured to select one or more oilfield brine feedstocks 48A, 48B, 48C, 48D, 48E from a plurality of oilfield brine feedstocks 48A, 48B, 48C, 48D, 48E received from a plurality of hydrocarbon-producing wells 22 based at least in part on one or more properties (e.g., composition, concentration, viscosity, salinity, and/or density of dissolved salts) of the one or more oilfield brine feedstocks 48A, 48B, 48C, 48D, 48E detected by one or more sensors 100, as described in greater detail herein, and to actuate (e.g., send control signals to) the valves 102 of the WHD system 32 to control blending of the one or more oilfield brine feedstocks 48A, 48B, 48C, 48D, 48E into a blended oilfield brine prior to desalinating the blended oilfield brine using the desalination system 104 to produce the desalinated water 96 and the saltwater 106, as described in greater detail herein.

In addition, in certain embodiments, the process control system 98 may be configured to determine a ratio of the saltwater 106 produced by the desalination system 104 and previously-produced desalinated water 96 to be alternatingly injected (or, simultaneously injected in a metered, dual stream fashion) into one or more SWD wells 44 based at least in part on one or more properties (e.g., composition, concentration, viscosity, salinity, and/or density of dissolved salts) of one or more oilfield brine feedstocks 48A, 48B, 48C, 48D, 48E detected by one or more sensors 100, and to actuate (e.g., send control signals to) the desalination system 104, as well as the various valves 102, 116, 118, equipment of the pumping system 108, the desalinated water pumps 120, and other processing equipment of the WHD system 32, and so forth, to control the metered or alternating injection of the saltwater 106 and the previously-produced desalinated water 96 into the one or more SWD wells 44 based at least in part on the determined ratio, as described in greater detail herein.

In addition, in certain embodiments, the process control system 98 may be configured to control injection of chemicals and/or scale prevention additives into one or more SWD wells 44 based at least in part on one or more properties (e.g., composition, concentration, viscosity, salinity, and/or density of dissolved salts) of one or more oilfield brine feedstocks 48A, 48B, 48C, 48D, 48E detected by one or more sensors 100, as described in greater detail herein.

Figure 16:
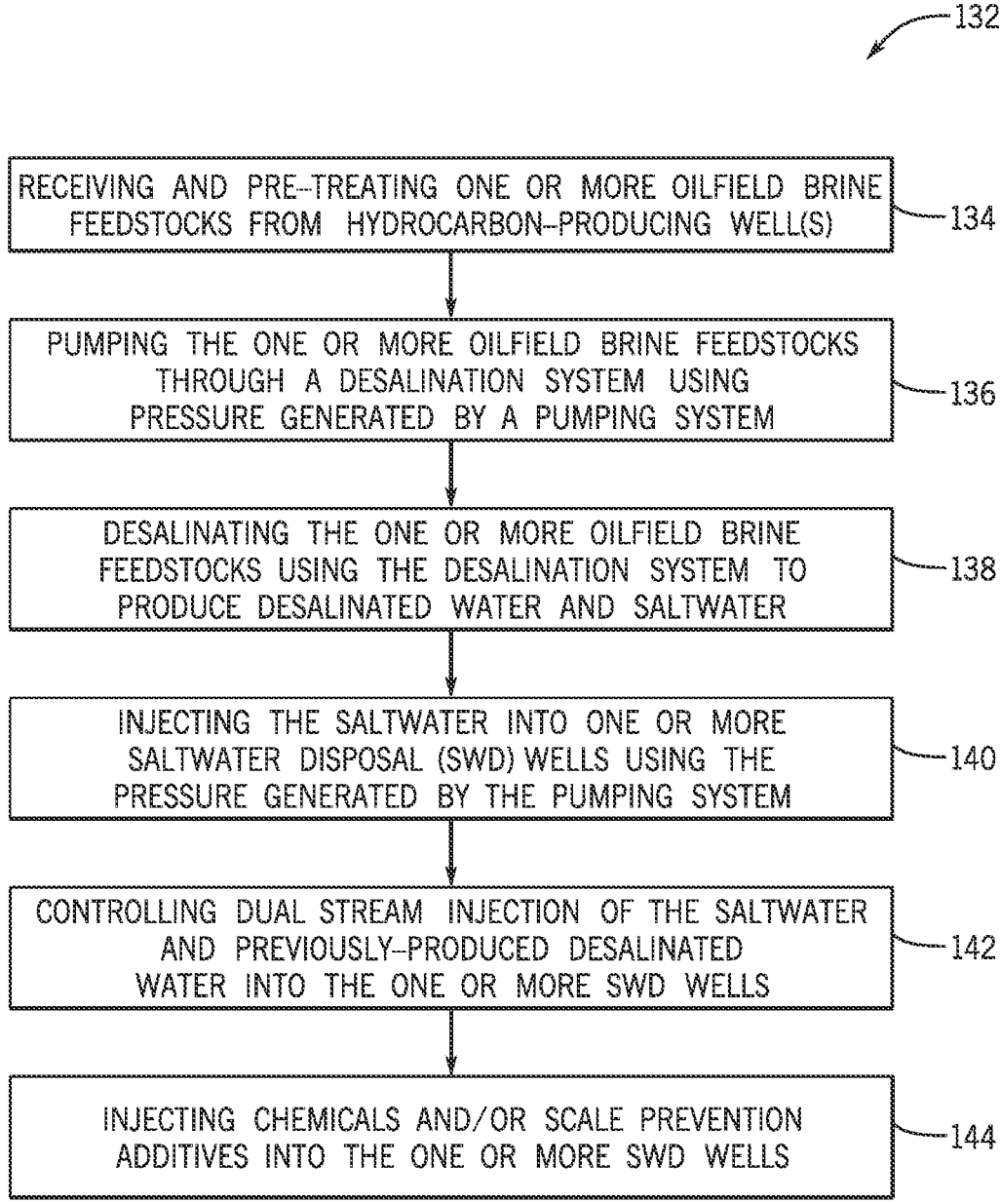
FIG. 16 is a block diagram of a method of processing oilfield brine using the WHD system of FIGS. 11-14, in accordance with embodiments of the present disclosure.

FIG. 16 is a block diagram of a method 132 of processing oilfield brine 48 using the WHD system 32, as described in greater detail herein. As illustrated in FIG. 16, in certain embodiments, the method 132 includes receiving (and, in certain embodiments, pre-treating) one or more oilfield brine feedstocks 48A, 48B, 48C, 48D, 48E from one or more hydrocarbon-producing wells 22 (block 134). In addition, in certain embodiments, the method 132 includes pumping the one or more oilfield brine feedstocks 48A, 48B, 48C, 48D, 48E through a desalination system 104 using pressure generated by the pumping system 108 (block 136). In addition, in certain embodiments, the method 132 includes desalinating the one or more oilfield brine feedstocks 48A, 48B, 48C, 48D, 48E using the desalination system 104 to produce desalinated water 96 and saltwater 106 (block 138). In addition, in certain embodiments, the method 132 includes injecting the saltwater 106 into one or more SWD wells 44 using the pressure generated by the pumping system 108 (block 140). In addition, in certain embodiments, the method 132 optionally includes controlling dual stream injection of the saltwater 106 and previously-produced desalinated water 96 (e.g., via alternating injection and/or simultaneous metered injection) into the one or more SWD wells 44 using pressure generated by one or more desalinated water pumps 120 (block 142). In addition, in certain embodiments, the method 132 optionally includes injecting chemicals and/or scale prevention additives into the one or more SWD wells 44 (block 144).

As described above, certain embodiments of the present disclosure include a method that includes receiving one or more oilfield brine feedstocks from one or more producing wells producing hydrocarbons from a subterranean formation. The method also includes desalinating and at least partially crystallizing a portion of the one or more oilfield brine feedstocks to produce desalinated water and a salt slurry suspension. The method further includes selecting, using a process control system, one or more candidate wells for reinjection of the salt slurry suspension into the one or more candidate wells. In addition, the method includes reinjecting the salt slurry suspension into the one or more candidate wells.

In certain embodiments, the method also includes selecting, using a process control system, the one or more oilfield brine feedstocks from a plurality of oilfield brine feedstocks received from a plurality of producing wells producing hydrocarbons from the subterranean formation; and blending the one or more oilfield brine feedstocks into a blended oilfield brine prior to desalinating and at least partially crystallizing the blended oilfield brine to produce the desalinated water and the salt slurry suspension. In addition, in certain embodiments, the method also includes detecting, using one or more sensors, one or more properties of the one or more oilfield brine feedstocks; and selecting, using the process control system, the one or more oilfield brine feedstocks from the plurality of oilfield brine feedstocks based at least in part on the one or more properties of the one or more oilfield brine feedstocks. In addition, in certain embodiments, the one or more properties of the one or more oilfield brine feedstocks include composition, concentration, salinity, viscosity, and/or density of dissolved salts in the one or more oilfield brine feedstocks.

In addition, in certain embodiments, the method also includes preparing the salt slurry suspension prior to reinjection into the one or more candidate wells. In addition, in certain embodiments, preparing the salt slurry suspension includes adjusting a size of salt particles in the salt slurry suspension, adding one or more chemical additives to the salt slurry suspension, or some combination thereof, based at least in part on control signals received from a process control system. In addition, in certain embodiments, desalinating and at least partially crystallizing the portion of the one or more oilfield brine feedstocks includes utilizing solar energy, evaporation ponds, zero liquid discharge technologies, or some combination thereof. In addition, in certain embodiments, the method also includes reinjecting the salt slurry suspension into the one or more candidate wells above a fracturing gradient of the subterranean formation to create a hydraulic fracture in the subterranean formation that contains solid state salt crystals.

In addition, as described above, certain embodiments of the present disclosure include an oilfield brine processing system that includes a desalination/crystallization system configured to receive one or more oilfield brine feedstocks from one or more producing wells producing hydrocarbons from a subterranean formation, and to desalinate and at least partially crystallize a portion of the one or more oilfield brine feedstocks to produce desalinated water and a salt slurry suspension. The oilfield brine processing system also includes a salt slurry suspension preparation system configured to prepare the salt slurry suspension, and to provide the salt slurry suspension to one or more candidate wells for reinjection of the salt slurry suspension into the one or more candidate wells.

In certain embodiments, the oilfield brine processing system also includes a treatment selection/design system configured to select the one or more candidate wells for reinjection of the salt slurry suspension into the one or more candidate wells. In addition, in certain embodiments, the salt slurry suspension preparation system is configured to adjust a size of salt particles in the salt slurry suspension, add one or more chemical additives to the salt slurry suspension, or some combination thereof, based at least in part on control signals received from a process control system. In addition, in certain embodiments, the desalination/crystallization system utilizes solar energy, evaporation ponds, zero liquid discharge technologies, or some combination thereof.

In addition, in certain embodiments, the oilfield brine processing system also includes a process control system configured to select the one or more oilfield brine feedstocks from a plurality of oilfield brine feedstocks received from a plurality of producing wells producing hydrocarbons from the subterranean formation, and to send one or more control signals to blend the one or more oilfield brine feedstocks into a blended oilfield brine prior to desalinating and at least partially crystallizing the blended oilfield brine using the desalination/crystallization system to produce the desalinated water and the salt slurry suspension. In certain embodiments, the oilfield brine processing system also includes one or more sensors corresponding to the one or more oilfield brine feedstocks and configured to detect one or more properties of the one or more oilfield brine feedstocks, wherein the process control system is configured to select the one or more oilfield brine feedstocks from the plurality of oilfield brine feedstocks based at least in part on the one or more properties of the one or more oilfield brine feedstocks. In certain embodiments, the one or more properties of the one or more oilfield brine feedstocks include composition, concentration, viscosity, and/or density of dissolved salts in the one or more oilfield brine feedstocks.

In addition, as described above, certain embodiments of the present disclosure include an oilfield brine processing system that includes a desalination/crystallization system configured to receive one or more oilfield brine feedstocks from one or more producing wells producing hydrocarbons from a subterranean formation, and to desalinate and at least partially crystallize a portion of the one or more oilfield brine feedstocks to produce desalinated water and a salt slurry suspension. The oilfield brine processing system also includes a salt slurry suspension preparation system configured to prepare the salt slurry suspension, and to provide the salt slurry suspension to one or more candidate wells for reinjection of the salt slurry suspension into the one or more candidate wells. The oilfield brine processing system further includes a process control system configured to select the one or more candidate wells for reinjection of the salt slurry suspension into the one or more candidate wells.

In addition, in certain embodiments, the oilfield brine processing system also includes one or more sensors corresponding to the one or more oilfield brine feedstocks and configured to detect one or more properties of the one or more oilfield brine feedstocks, wherein the process control system is configured to select the one or more oilfield brine feedstocks from the plurality of oilfield brine feedstocks based at least in part on the one or more properties of the one or more oilfield brine feedstocks. In certain embodiments, the one or more properties of the one or more oilfield brine feedstocks include composition, concentration, viscosity, salinity, and/or density of dissolved salts in the one or more oilfield brine feedstocks. In addition, in certain embodiments, the salt slurry suspension preparation system is configured to adjust a size of salt particles in the salt slurry suspension, add one or more chemical additives to the salt slurry suspension, or some combination thereof, based at least in part on control signals received from a process control system.

In addition, as described above, certain embodiments of the present disclosure include a method that includes receiving one or more oilfield brine feedstocks from one or more hydrocarbon-producing wells. The method also includes pumping at least a portion of the one or more oilfield brine feedstocks through a desalination system using pressure generated by a pumping system. The method further includes desalinating the at least a portion of the one or more oilfield brine feedstocks using the desalination system to produce desalinated water and saltwater. In addition, the method includes injecting the saltwater into one or more SWD wells using the pressure generated by the pumping system.

In addition, in certain embodiments, at least a portion of the desalination system is located at a surface location associated with the one or more SWD wells. In addition, in certain embodiments, at least a portion of the desalination system is located within one or more wellbores of the one or more SWD wells. In addition, in certain embodiments, the desalination system includes one or more reverse osmosis (RO) membranes.

In addition, in certain embodiments, the method also includes selecting, using a process control system, the one or more oilfield brine feedstocks from a plurality of oilfield brine feedstocks received from a plurality of hydrocarbon-producing wells; and blending the at least a portion of the one or more oilfield brine feedstocks into a blended oilfield brine prior to desalinating the blended oilfield brine using the desalination system to produce the desalinated water and the saltwater. In addition, in certain embodiments, the method also includes detecting, using one or more sensors, one or more properties of the one or more oilfield brine feedstocks; and selecting, using the process control system, the one or more oilfield brine feedstocks from the plurality of oilfield brine feedstocks based at least in part on the one or more properties of the one or more oilfield brine feedstocks. In addition, in certain embodiments, the one or more properties of the one or more oilfield brine feedstocks include composition, concentration, salinity, viscosity, and/or density of dissolved salts in the one or more oilfield brine feedstocks.

In addition, in certain embodiments, the method also includes controlling dual stream injection of the saltwater and desalinated water into the one or more SWD wells. In addition, in certain embodiments, the method also includes detecting, using one or more sensors, one or more properties of the one or more oilfield brine feedstocks; determining, using a process control system, a ratio of the saltwater and the desalinated water to be injected into the one or more SWD wells based at least in part on the one or more properties of the one or more oilfield brine feedstocks; and controlling, using the process control system, the dual stream injection of the saltwater and the desalinated water into the one or more SWD wells based at least in part on the determined ratio. In addition, in certain embodiments, the method also includes controlling, using the process control system, injection of chemicals and/or scale prevention additives into the one or more SWD wells based at least in part on the one or more properties of the one or more oilfield brine feedstocks. In addition, in certain embodiments, the one or more properties of the one or more oilfield brine feedstocks include composition, concentration, salinity, viscosity, and/or density of dissolved salts in the one or more oilfield brine feedstocks.

In addition, as described above, certain embodiments of the present disclosure include a WHD system that includes one or more SWD wells configured to inject saltwater into a subterranean SWD formation. The WHD system also includes a desalination system configured to desalinate at least a portion of the one or more oilfield brine feedstocks received from one or more hydrocarbon-producing wells to produce desalinated water and saltwater. The WHD system further includes a pumping system configured to generate pressure to pump the at least a portion of the one or more oilfield brine feedstocks through the desalination system and to inject the saltwater produced by the desalination system into the one or more SWD wells. In addition, the WHD system includes a process control system configured to control a composition of the saltwater injected into the one or more SWD wells based at least in part on one or more properties of the one or more oilfield brine feedstocks detected by one or more sensors.

In addition, in certain embodiments, at least a portion of the desalination system is located at a surface location associated with the one or more SWD wells. In addition, in certain embodiments, at least a portion of the desalination system is located within one or more wellbores of the one or more SWD wells. In addition, in certain embodiments, the WHD system also includes the desalination system includes one or more reverse osmosis (RO) membranes. In addition, in certain embodiments, the one or more properties of the one or more oilfield brine feedstocks include composition, concentration, salinity, viscosity, and/or density of dissolved salts in the one or more oilfield brine feedstocks.

In addition, in certain embodiments, the process control system is configured to select the one or more oilfield brine feedstocks from a plurality of oilfield brine feedstocks received from a plurality of hydrocarbon-producing wells based at least in part on the one or more properties of the one or more oilfield brine feedstocks; and control one or more valves to blend at least a portion of the one or more oilfield brine feedstocks into a blended oilfield brine prior to desalinating the blended oilfield brine using the desalination system to produce the desalinated water and the saltwater. In addition, in certain embodiments, the process control system is configured to control dual stream injection of the saltwater and desalinated water into the one or more SWD wells based at least in part on one or more properties of the one or more oilfield brine feedstocks detected by one or more sensors. In addition, in certain embodiments, the process control system is configured to determine a ratio of the saltwater and the desalinated water to be injected into the one or more SWD wells based at least in part on the one or more properties of the one or more oilfield brine feedstocks; and control the dual stream injection of the saltwater and the desalinated water into the one or more SWD wells based at least in part on the determined ratio. In addition, in certain embodiments, the process control system is configured to control injection of chemicals and/or scale prevention additives into the one or more SWD wells based at least in part on the one or more properties of the one or more oilfield brine feedstocks.

In addition, as described above, certain embodiments of the present disclosure include a method that includes receiving one or more oilfield brine feedstocks from one or more hydrocarbon-producing wells. The method also includes using a pumping system to inject at least a portion of the one or more oilfield brine feedstocks into one or more SWD wells. The method further includes actively controlling, using a process control system, a composition of the at least a portion of the one or more oilfield brine feedstocks injected into the one or more SWD wells based at least in part on one or more properties of the one or more oilfield brine feedstocks detected by one or more sensors. In addition, in certain embodiments, actively controlling a composition of the at least a portion of the one or more oilfield brine feedstocks injected into the one or more SWD wells includes controlling, using the process control system, injection of chemicals and/or scale prevention additives into the one or more SWD wells based at least in part on the one or more properties of the one or more oilfield brine feedstocks.

In addition, in certain embodiments, the method also includes actively controlling a composition of the at least a portion of the one or more oilfield brine feedstocks injected into the one or more SWD wells includes controlling dual stream injection of the at least a portion of the one or more oilfield brine feedstocks and desalinated water into the one or more SWD wells. In addition, in certain embodiments, the method also includes determining, using the process control system, a ratio of the at least a portion of the one or more oilfield brine feedstocks and the desalinated water to be injected into the one or more SWD wells based at least in part on the one or more properties of the one or more oilfield brine feedstocks; and controlling, using the process control system, the dual stream injection of the at least a portion of the one or more oilfield brine feedstocks and the desalinated water into the one or more SWD wells based at least in part on the determined ratio.

In addition, in certain embodiments, the method also includes selecting, using the process control system, the one or more oilfield brine feedstocks from a plurality of oilfield brine feedstocks received from a plurality of hydrocarbon-producing wells; and blending the one or more oilfield brine feedstocks into a blended oilfield brine prior to injection of the blended oilfield brine into the one or more SWD wells. In addition, in certain embodiments, the method also includes selecting, using the process control system, the one or more oilfield brine feedstocks from the plurality of oilfield brine feedstocks based at least in part on the one or more properties of the one or more oilfield brine feedstocks.

In addition, in certain embodiments, the method also includes pumping the at least a portion of the one or more oilfield brine feedstocks through a desalination system prior to injection of the at least a portion of the one or more oilfield brine feedstocks into the one or more SWD wells; desalinating the at least a portion of the one or more oilfield brine feedstocks using the desalination system to produce desalinated water and saltwater; and actively controlling, using the process control system, the composition of the saltwater injected into the one or more SWD wells based at least in part on the one or more properties of the one or more oilfield brine feedstocks. The specific embodiments described above have been illustrated by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
receiving a plurality of oilfield brine feedstocks from one or more producing wells producing hydrocarbons from a subterranean formation;
detecting, using one or more sensors, one or more properties of the plurality of oilfield brine feedstocks;
selecting two or more oilfield brine feedstocks from the plurality of oilfield brine feedstocks based at least in part on the one or more properties of the plurality of oilfield brine feedstocks;
blending the two or more oilfield brine feedstocks into a blended oilfield brine prior to desalinating and crystallizing a portion of the blended oilfield brine;
desalinating and crystallizing the portion of the blended oilfield brine to produce desalinated water and a salt slurry suspension;
selecting one or more candidate wells for reinjection of the salt slurry suspension into the one or more candidate wells; and
reinjecting the salt slurry suspension into the one or more candidate wells.

2. The method of claim 1, wherein the one or more properties of the plurality of oilfield brine feedstocks comprise at least one of composition, concentration, salinity, viscosity, or density of dissolved salts in the plurality of oilfield brine feedstocks.

3. The method of claim 1, comprising preparing the salt slurry suspension prior to reinjection into the one or more candidate wells.

4. The method of claim 3, wherein preparing the salt slurry suspension comprises adjusting a size of salt particles in the salt slurry suspension, adding one or more chemical additives to the salt slurry suspension, or some combination thereof, based at least in part on control signals received from a process control system.

5. The method of claim 1, wherein desalinating and crystallizing the portion of the blended oilfield brine comprises utilizing solar energy, evaporation ponds, or some combination thereof.

6. The method of claim 1, comprising reinjecting the salt slurry suspension into the one or more candidate wells above a fracturing gradient of the subterranean formation to create a hydraulic fracture in the subterranean formation that contains solid state salt crystals.

7. A method, comprising:
receiving a plurality of oilfield brine feedstocks from one or more hydrocarbon-producing wells;
selecting two or more oilfield brine feedstocks from the plurality of oilfield brine feedstocks;
blending the two or more oilfield brine feedstocks into a blended oilfield brine prior to desalinating the blended oilfield brine;
pumping a portion of the blended oilfield brine through a desalination system using pressure generated by a pumping system;
desalinating the portion of the blended oilfield brine to produce desalinated water and saltwater; and
injecting the saltwater into one or more saltwater disposal (SWD) wells using the pressure generated by the pumping system.

8. The method of claim 7, wherein at least a portion of the desalination system is located at a surface location associated with the one or more SWD wells.

9. The method of claim 7, wherein at least a portion of the desalination system is located within one or more wellbores of the one or more SWD wells.

10. The method of claim 7, wherein the desalination system comprises one or more reverse osmosis (RO) membranes.

11. The method of claim 7, comprising:
detecting, using one or more sensors, one or more properties of the plurality of oilfield brine feedstocks; and selecting the two or more oilfield brine feedstocks from the plurality of oilfield brine feedstocks based at least in part on the one or more properties of the plurality of oilfield brine feedstocks.

12. The method of claim 11, wherein the one or more properties of the plurality of oilfield brine feedstocks comprise at least one of composition, concentration, salinity, viscosity, or density of dissolved salts in the plurality of oilfield brine feedstocks.

13. The method of claim 7, comprising controlling injection of a first stream of the saltwater and a second stream of the desalinated water into the one or more SWD wells.

14. The method of claim 13, comprising:
detecting, using one or more sensors, one or more properties of the plurality of oilfield brine feedstocks;
determining a ratio of the saltwater and the desalinated water to be injected into the one or more SWD wells based at least in part on the one or more properties of the plurality of oilfield brine feedstocks; and
controlling injection of the first stream of the saltwater and the second stream of the desalinated water into the one or more SWD wells based at least in part on the determined ratio.

15. The method of claim 14, comprising controlling injection of at least one of chemicals or scale prevention additives into the one or more SWD wells based at least in part on the one or more properties of the plurality of oilfield brine feedstocks.

16. The method of claim 14, wherein the one or more properties of the plurality of oilfield brine feedstocks comprise at least one of composition, concentration, salinity, viscosity, or density of dissolved salts in the plurality of oilfield brine feedstocks.

17. A method, comprising:
receiving one or more oilfield brine feedstocks from one or more hydrocarbon-producing wells;
detecting, using one or more sensors, one or more properties of the one or more oilfield brine feedstocks;
pumping a portion of the one or more oilfield brine feedstocks through a desalination system using pressure generated by a pumping system;
desalinating the portion of the one or more oilfield brine feedstocks to produce desalinated water and saltwater;
determining a ratio of the saltwater and the desalinated water to be injected into one or more saltwater disposal (SWD) wells based at least in part on the one or more properties of the one or more oilfield brine feedstocks;
injecting a first stream of the saltwater and a second stream of the desalinated water into the one or more SWD wells using the pressure generated by the pumping system; and
controlling the injection of the first stream of the saltwater and the second stream of the desalinated water into the one or more SWD wells based at least in part on the determined ratio.

18. The method of claim 17, comprising controlling injection of at least one of chemicals or scale prevention additives into the one or more SWD wells based at least in part on the one or more properties of the one or more oilfield brine feedstocks.

19. The method of claim 17, wherein the one or more properties of the one or more oilfield brine feedstocks comprise at least one of composition, concentration, salinity, viscosity, or density of dissolved salts in the one or more oilfield brine feedstocks.

* * * * *